(12) United States Patent
Purdy et al.

(10) Patent No.: US 10,982,133 B2
(45) Date of Patent: Apr. 20, 2021

(54) MODIFIED ACID COMPOSITIONS AS ALTERNATIVES TO CONVENTIONAL ACIDS IN THE OIL AND GAS INDUSTRY

(71) Applicant: Fluid Energy Group Ltd., Calgary (CA)

(72) Inventors: Clay Purdy, Medicine Hat (CA); Markus Weissenberger, Calgary (CA)

(73) Assignee: FLUID ENERGY GROUP LTD, Calgary (CA)

( * ) Notice: Subject to any disclaimer, the term of this patent is extended or adjusted under 35 U.S.C. 154(b) by 30 days.

(21) Appl. No.: 16/226,256

(22) Filed: Dec. 19, 2018

(65) Prior Publication Data

US 2019/0194528 A1   Jun. 27, 2019

(30) Foreign Application Priority Data

Dec. 22, 2017   (CA) .................................. CA 2989929

(51) Int. Cl.
| | |
|---|---|
| *C09K 8/74* | (2006.01) |
| *C09K 8/528* | (2006.01) |
| *C23F 11/04* | (2006.01) |
| *E21B 43/26* | (2006.01) |
| *E21B 37/06* | (2006.01) |

(52) U.S. Cl.
CPC ................ *C09K 8/74* (2013.01); *C09K 8/528* (2013.01); *C23F 11/04* (2013.01); *C09K 2208/32* (2013.01); *E21B 37/06* (2013.01); *E21B 43/26* (2013.01)

(58) Field of Classification Search
None
See application file for complete search history.

(56) References Cited

U.S. PATENT DOCUMENTS

2008/0119374 A1* 5/2008 Willberg .................. C09K 8/76
507/209
2016/0130496 A1* 5/2016 Holtsclaw ............... C04B 28/02
507/226

* cited by examiner

*Primary Examiner* — Jeffrey D Washville
(74) *Attorney, Agent, or Firm* — Berg Hill Greenleaf Ruscitti LLP

(57) ABSTRACT

An aqueous modified acid composition for use in oil industry activities, said composition comprising: an amino acid, an alkanolamine and strong acid wherein the mineral acid: alkanolamine/amino acid are present in a molar ratio of not more than 15:1, preferably not more than 10:1; it can also further comprise a metal iodide or iodate. Said composition demonstrates advantages over known conventional acids and modified acids.

21 Claims, 7 Drawing Sheets

MODIFIED ACID COMPOSITIONS AS ALTERNATIVES TO CONVENTIONAL ACIDS IN THE OIL AND GAS INDUSTRY

FIELD OF THE INVENTION

This invention relates to compositions for use in performing various applications in the oil & gas industry, more specifically it relates to the use of a combination of modified acids to create an aqueous modified acid composition as an alternative to conventional mineral and organic acids for use over a broad range of temperatures.

BACKGROUND OF THE INVENTION

In the oil & gas industry, stimulation with an acid is performed on a well to increase or restore production. Typically a new well initially exhibits low production, and stimulation is employed to commence or initiate production from the reservoir. In other instances, stimulation or remediation is used to further encourage permeability and flow from an already existing well that has become underproductive due to scaling issues or exposed formation depletion.

Acidizing is a type of stimulation treatment which is performed above or below the reservoir fracture pressure in an effort to initiate, restore or increase the natural permeability of the reservoir, remove near wellbore damage and increase or maintain production levels. Acidizing is achieved by pumping acid, predominantly hydrochloric acid, into the well to dissolve typically limestone, dolomite and calcite cement between the acid insoluble sediment grains of the reservoir rocks, creating wormholes or conductive channels to increase formation contact to the wellbore or to treat scale accumulation.

There are four major types of acid applications: matrix acidizing, fracture acidizing, remedial acidizing and breakdown or spearhead acidizing (pumped prior to a fracturing pad or cement operation in order to assist with formation breakdown (reduce fracture pressures, increased feed rates), as well as clean up left over cement in the well bore or perforations. A matrix acid treatment is performed when acid is pumped into the well and into the pores of the reservoir formation below the fracture pressure creating wormholes. In this form of acidization, the acids dissolve the sediments formation and/or mud solids that are inhibiting the permeability of the rock, enlarging the natural pores of the reservoir or creating channels where formation exposure is limited (wormholing) and stimulating the flow of hydrocarbons to the wellbore for recovery. While matrix acidizing is done at a low enough pressure to keep from fracturing the reservoir rock (keeping treating pressures below the estimated fracture gradient), fracture acidizing involves pumping acid into the well at a very high pressure above the fracture gradient, physically fracturing the reservoir rock and etching the permeability inhibitive sediments. This type of acid treatment forms channels or fractures through which the hydrocarbons can flow, in addition to forming a series of wormholes. In some instances, a proppant is introduced into the fluid which assists in propping open the fractures, further enhancing the flow of hydrocarbons into the wellbore.

There are many different mineral and organic acids used to perform acid treatments on wells. The most common type of acid employed on wells to stimulate production is hydrochloric acid (HCl), which is useful in stimulating carbonate reservoirs, typically at a 15% or 28% strength.

Some of the major challenges faced in the oil & gas industry from using hydrochloric acid include the following: extremely high levels of corrosion (which is countered by the addition of 'filming' type corrosion inhibitors that are typically themselves toxic and harmful to humans, the environment and equipment) reactions between acids and various types of metals can vary greatly but softer metals, such as aluminum and magnesium, are very susceptible to major effects causing immediate damage. Hydrochloric acid produces hydrogen chloride gas which is toxic (potentially fatal) and corrosive to skin, eyes and metals. At levels above 50 ppm (parts per million) it can be Immediately Dangerous to Life and Health (IDHL). At levels from 1300-2000 ppm death can occur in 2-3 minutes. Hydrochloric acid is also very incompatible with wellbore fluids and thus requires the addition of additional chemistry to inhibit the formation of sludge. In addition, as hydrochloric acid spends (reacts) with the formation and the pH subsequently rises after the reactions have ceased the increase in pH will cause a precipitation of solubilized carbonate materials causing wellbore damage/blockage. It is very desirable to have an acid system that will not precipitate solubilized carbonate materials at increased pH levels.

The inherent environmental effects (organic sterility, poisoning of wildlife etc.) of strong mineral acids in the event of an unintended or accidental release on surface or downhole into water aquifers or other sources of water are devastating and can cause significant pH reduction of such and can substantially increase the toxicity and could potentially cause a mass culling of aquatic species and potential poisoning of humans or livestock and wildlife exposed to/or drinking the water. An unintended release at surface can also cause hydrogen chloride gas to be released, potentially endangering human and animal health. This is a common event at large storage sites when tanks split or leak. Typically if near the public, large areas need to be evacuated post event and a comprehensive, expensive to implement, emergency evacuation plan needs to be in place prior to approval of such storage areas. Because of its acidic nature, hydrogen chloride gas is also corrosive, particularly in the presence of moisture.

The inability for mineral acids with common corrosion and compatibility control additives and blends of such to biodegrade naturally results in expensive cleanup-reclamation costs for the operator should an unintended release occur. Moreover, the toxic fumes produced by mineral & some organic acids are harmful to humans/animals and are highly corrosive and/or produce potentially explosive vapours. Transportation and storage requirements for acids are restrictive and taxing. As well, the dangers surrounding exposure by personnel handling the blending of such dangerous products constrict their use/implementation in areas of high risk such as within city limits and environmentally sensitive areas such as offshore. It is highly desirable to have a strong acid that alleviates these storage, transportation, compatibility issues common with hydrochloric acid.

Another concern is the potential for exposure incidents on locations due to high corrosion levels, even at ambient temperatures, of acids causing potential storage tank structure or valve failures and/or deployment equipment failures i.e. coiled tubing or high pressure iron failures caused by high corrosion high rates (pitting, cracks, pinholes). Other concerns include: downhole equipment failures from corrosion causing the operator to have to execute a work-over and replace down hole pumps, tubulars, cables, packers etc.; inconsistent strength or quality level of mineral & organic acids; potential supply issues based on industrial output levels; high levels of corrosion on surface pumping equipment resulting in expensive repair and maintenance levels for operators and service companies; the requirement of specialized equipment that is purpose built to pump acids greatly increasing the capital expenditures of operators and service companies; and the inability to source a finished product locally or very near its end use; transportation and onsite storage difficulties.

Typically, acids are produced in industrial areas of countries located some distance from oil & gas producing areas, up to and sometimes over 10 additives can also be required to control various aspects of the acids properties adding to complications in the handling and shipping logistics. Having an alternative that requires minimal additives is very advantageous.

Extremely high corrosion and reaction rates with temperature increase causes conventional acids to spend/react or "neutralize" prior to achieving the desired effect such as deeply penetrating an oil or gas formation to increase the wormhole or etched "pathway" effectively to allow the petroleum product to flow freely to the wellbore.

When used to treat scaling issues on surface equipment due to water mineral precipitation, conventional acids are exposed to human and mechanical devices as well as expensive equipment causing increased risk and cost for the operator. When mixed with bases or higher pH fluids, acids will create a large amount of thermal energy (exothermic reaction) causing potential safety concerns and equipment damage, acids typically need to be blended with fresh water (due to their intolerance of highly saline water, causing potential precipitation of minerals) to the desired concentration requiring companies to pre-blend off-site as opposed to blending on-site with sea or produced water thereby increasing costs associated with transportation. It is advantageous to have an acid system that is compatible with high salinity water and produces a far less aggressive exothermic reaction when diluted with water.

Conventional mineral acids used in a pH control application can cause rapid degradation of certain polymers and other additives requiring increased loadings or chemicals to be added to counter these negative effects. Many offshore areas of operations have very strict regulatory rules regarding the transportation, handling and deployment of acids causing increased liability and costs for the operator. When using an acid to pickle tubing or pipe, very careful attention must be paid to the process due to high levels of corrosion, as temperatures increase to higher levels, the typical additives used to control corrosion in acid systems begin to degrade very quickly (due to the inhibitors "plating out" on the steel or sheering out in high injection rate applications) causing the acids to become very corrosive and resulting in damage to downhole equipment/tubulars. Conventional acids can be harmful to many elastomers and/or seals found in the oil & gas industry such as those found in blow out preventers (BOP's)/downhole tools/packers/submersible pumps/seals etc. Having to deal with spent acid during the flow back process is also very expensive as these acids typically are still at a lower pH and remain toxic and corrosive. In many cases the spent acid needs to be unloaded from the wellbore into special containment and then transported to a disposal or recycling site. It is advantageous to have an acid blend that can be exported to production facilities through production pipelines greatly reducing disposal costs/fees. Also mineral acids will typically precipitate iron and/or minerals solubilized during the operation as the pH of the spent acid increases causing facility upsets and lost production. It is advantageous to have a strong acid that will hold these solubilized minerals and metals in solution even as pH rises well above 3.0 levels, greatly reducing the need to dispose of spent acids and allowing them to be processed and treated in a more economical manner. Acids are used in the performance of many operations in the oil & gas industry and are considered necessary to achieve the desired production of various petroleum wells and associated equipment, maintain their respective systems and aid in certain drilling operational functions (i.e. freeing stuck pipe, post drilling filter cake treatments). The associated dangers that come with using mineral acids are expansive and it is thus desirable to mitigate them through controls whether they are chemically or mechanically engineered.

Eliminating or even simply reducing the negative effects of strong acids while maintaining their usefulness is a struggle and risk for the industry. As the public and government demand for the use of less hazardous products increases, companies are looking for alternatives that perform the required function without all or most of the drawbacks associated with the use of conventional acids.

While some modified acids have overcome some problems emanating from the use of strong acids, their reactivity rate becomes a concern for the user who, in some cases, would need a fast acting acid such as a conventional mineral acid like 15% HCl, commonly utilized as a spearhead treatment acid (a volume of acid pumped ahead of a predominantly water based stage to assist in lowering injection pressures and clean up any residual acid soluble materials that may inhibit fluid injection). The careful balancing of increased safety (i.e. less fuming, less corrosive to metal and skin) and quick reaction time creates difficulties with operators who encounter regulatory, environmental or operational issues utilizing hydrochloric acid.

There is a range of hydraulic fracturing techniques and several different approaches may be applied within a specific area. Hydraulic fracturing or stimulation programs and the associated fluid composition vary based on the engineering requirements specific to the formation and formation fluids compatibilities, wellbore mineralogy, porosity and permeability and location. However, water based stimulation programs typically require the following four steps: the spearhead step; the pad step; the proppant step; and the flush step. In the spearhead step, which is commonly referred to as an acid step, operators typically use 10% to 15% hydrochloric acid, most preferred being 15% hydrochloric acid due to the highly reactive nature of the acid reducing the time required to initiate the preferred feed rate into the formation with the next stage or step. A spearhead acids purpose is to clear debris that is present in the wellbore perforations and assists in initiating the next stage of the fracture treatment at lower pressures providing a clear pathway for fracture fluids to access the formation. In the second step, the pad step, fluid is injected into the wellbore to break or fracture the formation and initiate the hydraulic fracturing of the target formation. No proppant is used during this step. In the third step, the proppant step, a mixture of water and proppant (most commonly natural sand or high strength synthetic proppant) is injected into the wellbore. The proppant is carried by the gelled or viscous fluid (also referred to as fracking fluid) into the formation and deposited. Some of the proppant remains in the formation to maintain the fractures open while the pressure is reduced and fluid is removed from the formation. The proppant remaining in formation allows the formation to maintain its new increased permeability. Lastly, the flush step involves the injection of a large volume of fresh water to be pumped down the wellbore to flush out the leftover excess proppant which could still be residing within the wellbore.

Several operations in the oil industry expose acids to very high temperatures (some up to and over 190° C.), the compositions used in these various operations need to withstand high temperatures without losing their overall effectiveness. These compositions must also be capable of being applied in operations over a wide range of temperatures while not or at least minimally affecting or corroding the equipment with which it comes in contact in comparison to a conventional mineral acid of which the corrosion effect at ultra-high temperatures is very difficult and expensive to control.

Many countries bordering the waters where offshore drilling and production is routinely carried out have put into play a number of regulations and operational parameters aimed at minimizing the environmental and human exposure impact. These regulations and procedures may include the ban and/or highly taxing regulation of certain chemicals which may be harmful to marine life and/or the environment. In order to overcome these very restrictive regulations, many oil companies employ very costly containment programs for the handling of certain chemicals, such as acids, which have a wide array of uses in the industry of oil and gas exploration and production or simply forgo the use of such advantageous chemicals and thus lose substantial productivity gained by completions optimization.

Acids conventionally used in various oil and gas operations can be exposed to temperatures of up to and over 190° C. At these temperatures, their reactivity and corrosive properties is exponentially increased and as such their economical effectiveness is greatly decreased. Corrosion is one of the major concerns at high temperatures and is difficult and expensive to control with additional chemistry, if it can be controlled at all. In some situations a mechanical procedure must be utilized as opposed to a chemical solution due to temperature constraints, such as shutting down steam injection, running cool-down pads or slugs, or other very expensive solutions to bring the well to acceptable temperature levels.

Modified and synthetic acids developed and currently patented such as those containing main components of urea and hydrochloric acid are aimed at increasing personnel safety, reducing corrosion effects, slowing down the reaction rate and reducing the toxicity of HCl. However, it has been found that at temperatures above 90° C. to 100° C. the urea component in a synthetic or modified acid containing such compound will decompose and produce ammonia and carbon dioxide as a by-product of decomposition. The ammonia component will neutralize the acidic component of the HCl and render the product non-reactive or neutral. Additionally there is the risk of wellbore and/or formation damage due to uncontrolled solubilized mineral precipitation due to the increase in pH caused predominantly by the formation of ammonia during the decomposition phase.

US 2016/0032176 A1 discloses methods for treating subterranean wells in which the producing formation is a carbonate comprise preparing a treatment fluid comprising either: (a) an aqueous solution of a multivalent-cation reacting polymer; (b) a solution comprising a fatty acid and an ethanolamine; (c) an aqueous acidic solution of one or more compounds whose calcium salts are insoluble; or (d) an aqueous solution comprising urea or alkane derivatives thereof or both and polyvinylpyrrolidone (PVP). It states that the treatment fluid is placed in the well such that the solution contacts the carbonate formation at a pressure lower than the fracturing pressure. It further states that the treatment fluid is allowed to react with the carbonate formation, thereby depositing a film onto the formation surface or part of the formation surface. Then an acid solution is placed in the well such that the acid contacts the carbonate formation at a pressure lower than the fracturing pressure.

Despite the prior art and in light of the substantial challenges elicited by the use of acids in oil and gas operations at high temperatures, there still exists a critical need to find an alternative to known synthetic or complexed/modified acids (in particular, Lewis Acid-Base Adducts) which will remain stable above temperatures of 90° C. while still providing the safety and lower corrosion effects of a modified acid and having a performance comparable to that of a conventional mineral acid such as HCl. The inventors have found that by combining an amino acid with an alkanolamine and a mineral acid in appropriate ratios one can obtain both a safer alternative to this dangerous conventional mineral acid, all the while substantially maintaining the performance properties of the acid thereby remaining useful in oil and gas operations while still being competitively priced.

Consequently, there is still a need for safer, more technically advanced strong acid compositions for use in various oil industry applications at all temperature ranges and which can decrease/minimize or eliminate a number of the associated dangers and/or operational issues, such as high corrosion rates and/or safety but not necessarily limited thereto. There is also a need for a technically advanced acid system that has a more superior wormholing performance than hydrochloric acid allowing operators to stimulated production in their carbonate formations at or below fracture gradients (low injection rates). In many jurisdictions around the world, fracturing operations have been suspended or banned. As well, many of these jurisdictions have also greatly regulated or banned the use of dangerous chemicals such as hydrochloric acid. With most all acid systems, as the injection rate is reduced to be well below the fracture gradient (and thus bypass restrictions), the required volume to achieve the similar reach or penetration into the formation increases exponentially. It is highly advantageous to have an acid system that will perform positively across a wide range of velocities/rates. Although surface pumping rates can be maintained at an optimal rate to suit a conventional HCl acid systems performance parameters (optimal injection rate), the formation properties can greatly alter the actual downhole velocities causing a conventional acids to fall far outside their respective optimal conditions. It is highly advantageous to have a strong acid system that will provide excellent wormholing performance at or well below fracture gradients without the increased volumes required typical with mineral acids at these lower rates.

It was discovered that the compositions according to the present invention exhibits stability for operations at elevated temperature (above 90° C. and up to 190° C.) and therefore makes them useful in the oil and gas industry for all applications where an acid is required and provides operators the ability to treat high temperature completions and maintenance/production operations with a technology that provides a level of safety, multiple technical advantages and low corrosion. This combination which is rare in the industry until now. The composition according to the present invention can ideally be used in oilfield operations, including but not limited to: spearhead breakdown acid, acid fracturing or matrix stimulation operations, injection-disposal well treatments, high temperature cyclical steam injection (CSS) scale treatments, steam assisted gravity drainage (SAGD) scale treatments, surface and subsurface equipment and pipelines facilities, filter cake removal, tubing pickling, soaks, cement squeezes, fluid pH control, stuck pipe operations, and coiled tubing acid washes, soaks and squeezes. The most preferred use of a composition according to the present invention is for spearhead acid, matrix and frac acidizing.

SUMMARY OF THE INVENTION

Compositions according to the present invention have been developed for the oil & gas industry and its associated applications, by targeting the problems of corrosion, logistics & handling, human & environmental exposure, reaction rates, wormholing or acid flux efficiencies, toxicity levels, biodegradation properties, formation/fluid compatibilities and facility and/or production and water treatment infrastructure and process compatibilities.

It is an object of the present invention to provide a modified acid composition which can be used over a broad range of applications in the oil and gas industry and which exhibit advantageous properties over known compositions. According to an aspect of the present invention, there is provided an aqueous synthetic or modified acid composition comprising:
 a mineral acid;
 an amino acid; and
 an alkanolamine;
wherein the mineral acid:alkanolamine/amino acid are present in a molar ratio of not more than 15:1.

Preferred embodiments of the present invention provide a modified acid composition which, upon proper use, results in a very low corrosion rate on oil and gas industry tubulars and associated equipment.

According to a preferred of the present invention, there is provided a modified acid composition for use in the oil industry which is biodegradable. According to a preferred of the present invention, there is provided a modified acid composition for use in the oil industry which will provide a thermal stability at temperatures above 90° C. and up to 190° C.

According to a preferred embodiment of the present invention, there is provided an aqueous modified acid composition for use in the oil industry which will provide corrosion protection at an acceptable oilfield limit at temperatures ranging up to 190° C.

According to a preferred embodiment of the present invention, there is provided an aqueous modified acid composition for use in the oil industry which has minimal exothermic reactivity upon dilution or during the diluting process.

According to a preferred embodiment of the present invention, there is provided an aqueous modified acid composition for use in the oil industry which is compatible with existing industry acid additives.

According to a preferred embodiment of the present invention, there is provided an aqueous modified acid composition for use in oil industry operations which is faster reacting than standard modified or synthetic acids known.

According to a preferred of the present invention, there is provided an aqueous modified acid composition for use in the oil industry which results in less unintended near wellbore erosion or face dissolution due to a more controlled hydrogen proton chemical reaction. This, in turn, results in deeper formation penetration, increased permeability, superior wormholing or acid flux, thinner, more efficient wormholes and reduces the potential for zonal communication during a typical 'open hole' mechanical isolation application treatment. As a highly reactive acid, such as hydrochloric acid, is deployed into a well that has open hole packers for isolation (without casing) there is a potential to cause a loss of near-wellbore compressive strength resulting in communication between zones or sections of interest as well as potential sand production, and fines migration.

Accordingly, a preferred embodiment of the present invention would overcome at least several of the drawbacks found in the use of conventional acid compositions of the prior art related to the oil & gas industry.

BRIEF DESCRIPTION OF THE FIGURES

The invention may be more completely understood in consideration of the following description of various embodiments of the invention in connection with the accompanying figure, in which.

DETAILED DESCRIPTION OF THE PREFERRED EMBODIMENTS AND DRAWINGS

Figure 1:
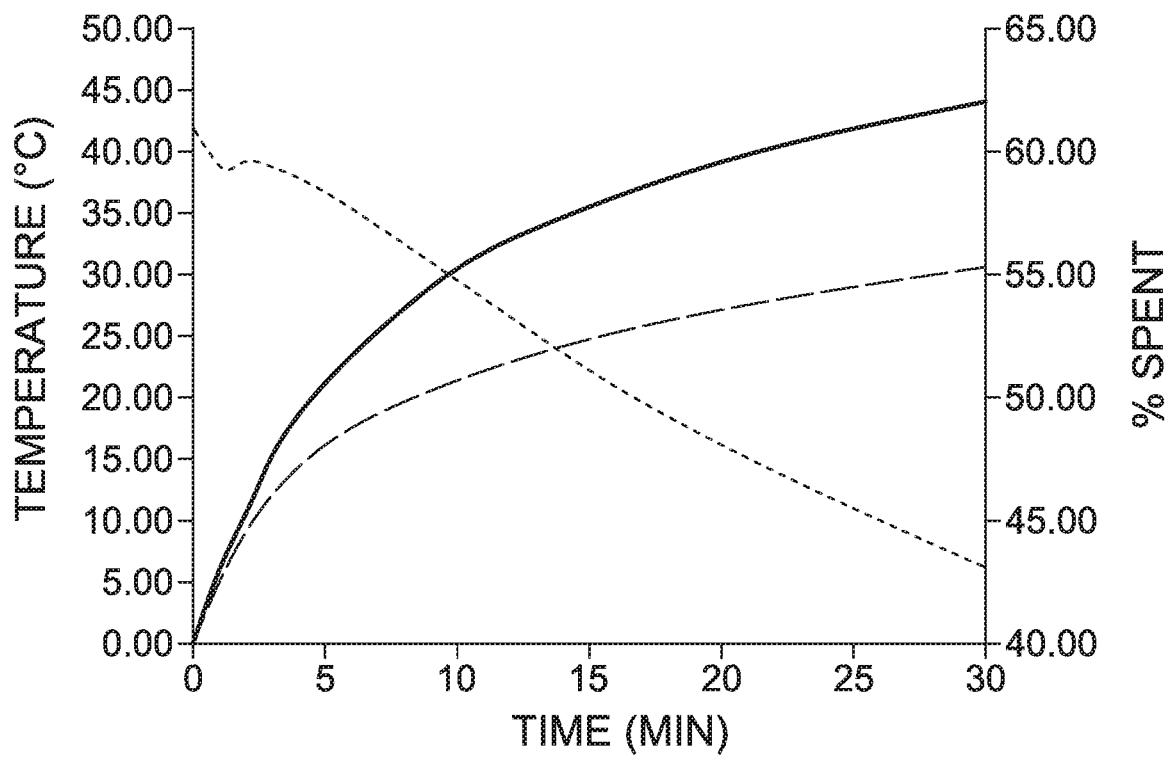
FIG. 1 is a graphical representation of the spend rate of two concentrations (50% and 90%) of a composition of Lysine-HCl:MEA-HCl (80:20) according to a preferred embodiment of the present invention.
Figure 2:
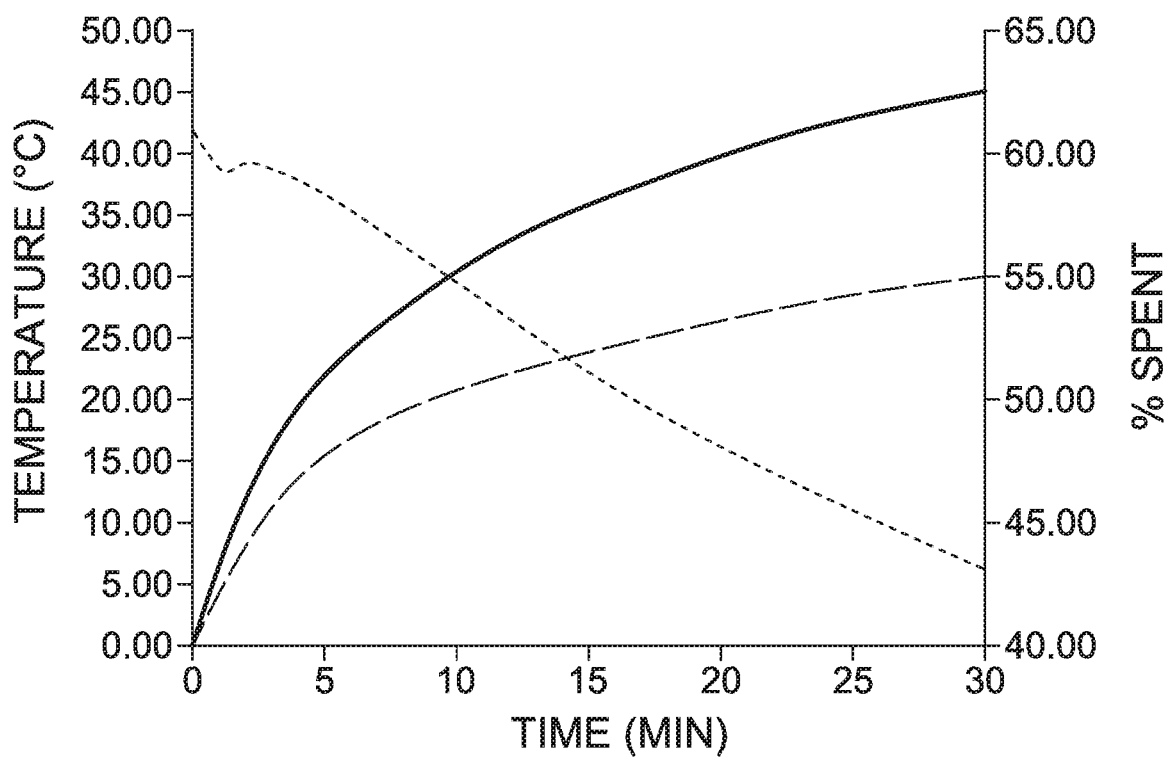
FIG. 2 is a graphical representation of the spend rate of two concentrations (50% and 90%) of a composition of Lysine-HCl:MEA-HCl (70:30) according to a preferred embodiment of the present invention.
Figure 3:
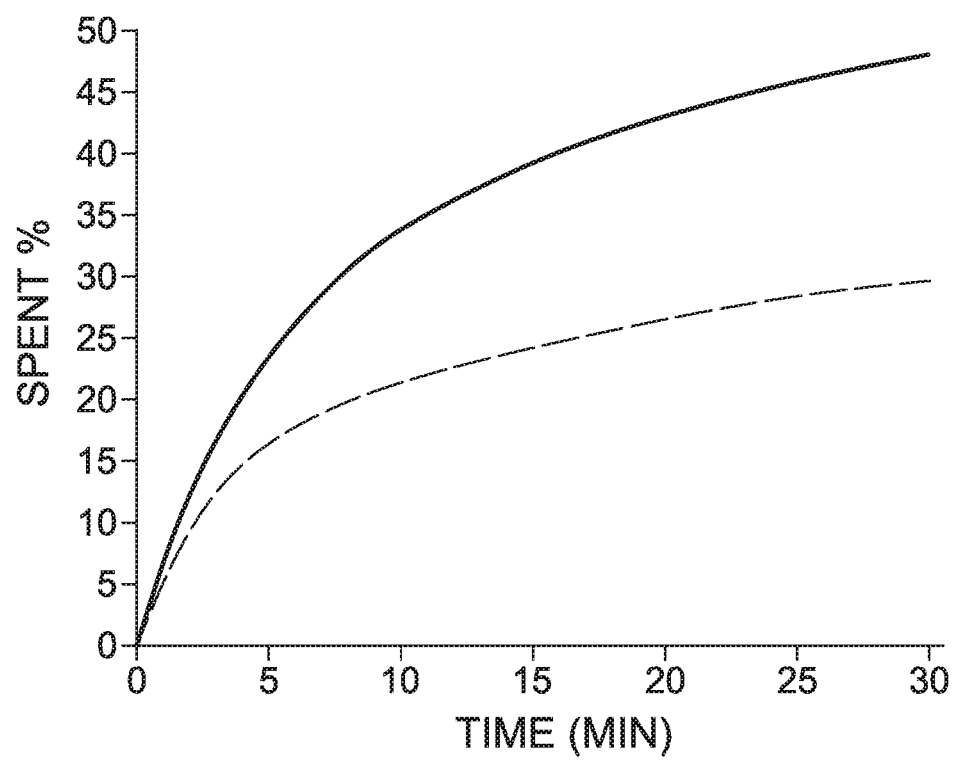
FIG. 3 is a graphical representation of the spend rate of two concentrations (50% and 90%) of a composition of Lysine-HCl:MEA-HCl (50:50) according to a preferred embodiment of the present invention.
Figure 4:
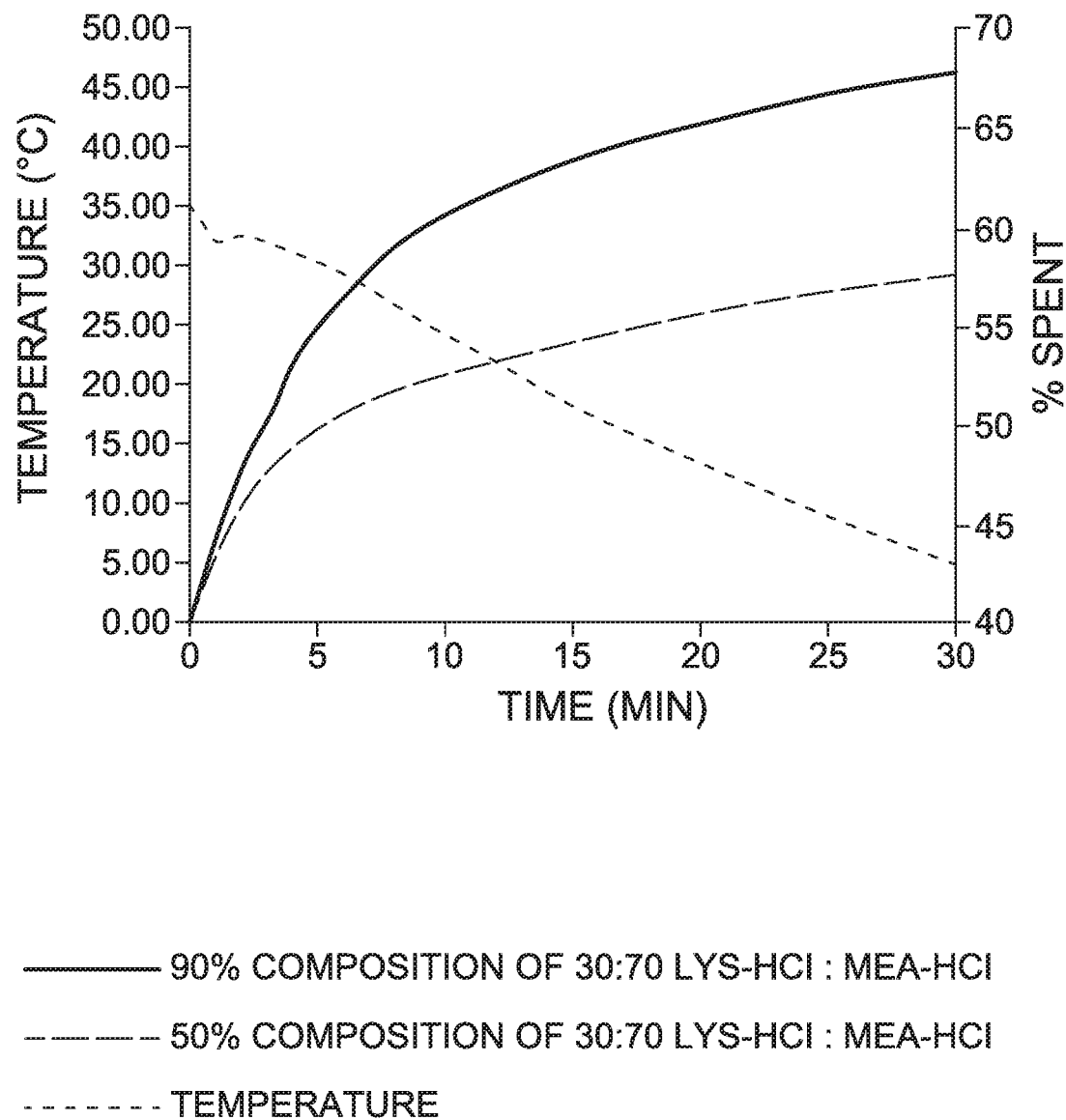
FIG. 4 is a graphical representation of the spend rate of two concentrations (50% and 90%) of a composition of Lysine-HCl:MEA-HCl (30:70) according to a preferred embodiment of the present invention.
Figure 5:
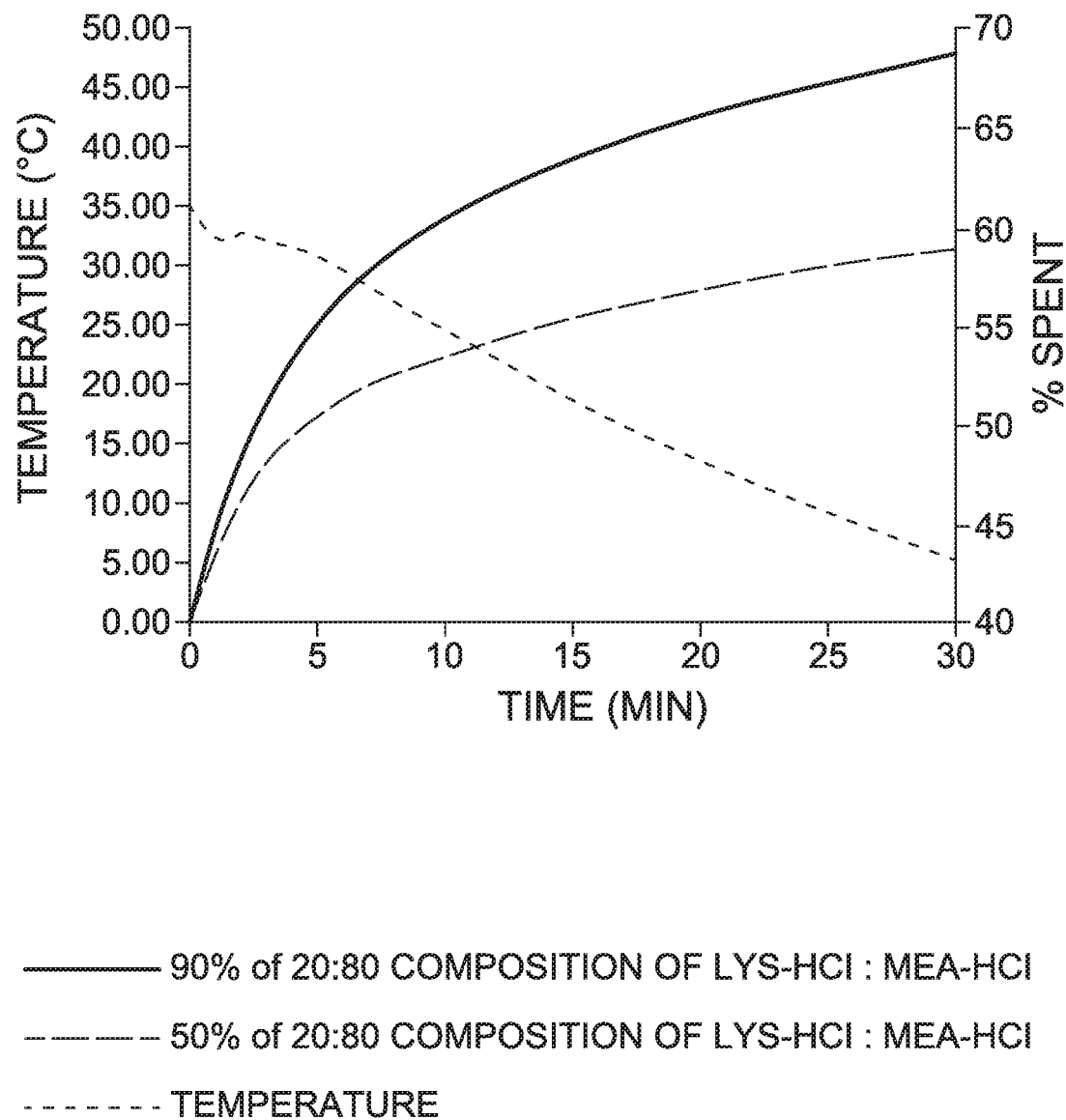
FIG. 5 is a graphical representation of the spend rate of two concentrations (50% and 90%) of a composition of Lysine-HCl:MEA-HCl (20:80) according to a preferred embodiment of the present invention.

The description that follows, and the embodiments described therein, is provided by way of illustration of an example, or examples, of particular embodiments of the principles of the present invention. These examples are provided for the purposes of explanation, and not limitation, of those principles and of the invention.

According to an aspect of the present invention, there is provided an aqueous synthetic or modified acid composition comprising:
 a mineral acid;
 an amino acid; and
 an alkanolamine;
wherein the mineral acid:alkanolamine/amino acid are present in a molar ratio of not more than 15:1. Preferably, the mineral acid:alkanolamine/amino acid are present in a molar ratio ranging from 3:1 to 12:1.

More preferably, the mineral acid:alkanolamine/amino acid are present in a molar ratio ranging from 5:1 to 10:1.

Preferably, the proportion of amino acid:alkanolamine ranges from 1%:99% to 99%:1%. More preferably, the proportion of amino acid:alkanolamine ranges from 20%:80% to 80%:20%. Even more preferably, the proportion of amino acid:alkanolamine ranges from 30%:70% to 70%:30%. Yet even more preferably, the proportion of amino acid:alkanolamine is 50%:50%.

Preferably, the mineral acid:alkanolamine/amino acid are present in a molar ratio of not more than 10:1. More preferably, the mineral acid:alkanolamine/amino acid are present in a molar ratio of not more than 7.0:1. According to a preferred embodiment, the mineral acid:alkanolamine/amino acid are present in a molar ratio of not more than 4:1. According to another preferred embodiment, the mineral acid:alkanolamine/amino acid are present in a molar ratio of not more than 3:1. According to a preferred embodiment, the molar ratio of mineral acid to amino acid/alkanolamine is calculated by determining the total number of moles of mineral acid (adding up the moles from the mineral acid/amino acid blend and the moles from the mineral acid/alkanolamine blend) and adding up the moles of amino acid in the first blend to the moles of alkanolamine from the second blend. Thus, for explanation purposes a ratio of 12:1 mineral acid:aminoacid/alkanolamine means that for every 12 moles of HCl there is a combined total of 1 mole of amino acid and alkanolamine. Moreover, the % proportion of amino acid:alkanolamine is to be understood in terms of moles of the mole total of amino acid and alkanolamine. For explanation purposes, when there is a 30%/70% blend of example 1/example 2 one is to understand that there is 0.3 mol amino acid to 0.7 mol alkanolamine.

Preferably, the alkanolamine is selected from the group consisting of: monoethanolamine; diethanolamine; triethanolamine and combinations thereof.

According to a preferred embodiment, the amino acid is selected from the group consisting of: lysine, glycine, valine, arginine, histidine, threonine, methionine, glutamic acid, asparagine, glutamine and combinations thereof.

According to a preferred embodiment, the alkanolamine is monoethanolamine. According to another preferred embodiment, the alkanolamine is diethanolamine.

According to a preferred embodiment, the mineral acid is selected from the group consisting of: HCl, nitric acid, sulfuric acid, sulfonic acid, phosphoric acid, and combinations thereof.

Preferably, the aqueous modified acid composition further comprising a metal iodide or iodate. Preferably, the metal iodide or iodate is selected from the group consisting of: cuprous iodide; potassium iodide; sodium iodide; lithium iodide and combinations thereof. More preferably, the metal iodide or iodate is potassium iodide.

According to a preferred embodiment, the aqueous modified acid composition further comprises an alcohol or derivative thereof. Preferably, the alcohol or derivative thereof is an alkynyl alcohol or derivative thereof. More preferably, the alkynyl alcohol or derivative thereof is propargyl alcohol or a derivative thereof. Preferably, the alkynyl alcohol or derivative thereof is present in a concentration ranging from 0.01 to 5% w/w. More preferably, the alkynyl alcohol or derivative thereof is present in a concentration of 0.2% w/w.

Preferably, the metal iodide is present in a concentration ranging from 0.1 to 2% by weight of the total weight of the composition.

Preferably, the main components in terms of volume and weight percent of the composition of the present invention comprise an amino acid, an alkanolamine and a strong acid, such as HCl, nitric acid, sulfuric acid, sulfonic acid. An alkanolamine according to the present invention contains at least one amino group, —NH$_2$, and one alcohol group, —OH. Preferred alkanolamines according to the present invention include, but are not limited to, monoethanolamine, diethanolamine and triethanolamine. More preferred are monoethanolamine, diethanolamine. Most preferred alkanolamine is monoethanolamine. Most preferred as amino acid is lysine monohydrochloride. When added to hydrochloric acid a Lewis acid/base adduct is formed where the primary amino group of lysine and monoethanolamine act as a Lewis base and the proton of the HCl as Lewis acid. The formed adduct greatly reduces the hazardous effects of the hydrochloric acid on its own, such as the fuming effect, the hygroscopicity, and the highly corrosive nature while also providing a distinct advantage to acid flux (wormholing) efficiency at low injection rates. Various organic acids are also contemplated according to a preferred embodiment of the present invention.

The molar ratio of the three main components (amino acid, alkanolamine and acid) can be adjusted or determined depending on the intended application, formation properties (permeability, porosity, mineralogy), along with the desired solubilizing ability. According to a preferred embodiment where the strong acid is HCl, one can increase the ratio of the HCl component to increase the solubilizing ability of the composition while still providing at least one of the following advantages: health; safety; environmental; and operational advantages over hydrochloric acid, such as low corrosion rates and thermal stability.

While an alkanolamine such as monoethanolamine is a compound known by the person of ordinary skill in the art, the latter knows that such a compound is not to be mixed with a strong acid such as HCl. In fact, the person skilled in the art will note upon review of the DOW safety data sheet for monoethanolamine LFG 85 that it indicates that one must avoid contact of this compound with strong acids.

Various corrosion inhibitors can be incorporated into a preferred composition of the present invention which comprises a strong acid and an alkanolamine to reduce corrosion on the steel which is contacted by the composition according to the present invention. According to a preferred embodiment of the present invention, the composition may further comprise organic compounds which may act as corrosion inhibitors selected from the group consisting of: acetylenic alcohols, aromatic or aliphatic aldehydes (e.g. α,β-unsaturated aldehydes), alkylphenones, amines, amides, nitrogen-containing heterocycles (e.g. imidazoline-based), iminium salts, triazoles, pyridine and its derivatives or salts, quinoline derivatives, thiourea derivatives, thiosemicarbazides, thiocyanates, quaternary amine salts, and condensation products of carbonyls and amines. Intensifiers which can be incorporated into compositions according to the present invention are selected from the group consisting of: formic acid, potassium iodide, antimony oxide, copper iodide, sodium iodide, lithium iodide, aluminium chloride, bismuth oxide, calcium chloride, magnesium chloride and combinations of these. Preferably, an iodide compound such as potassium iodide is used.

Other additives can be optionally added to a composition according to a preferred embodiment of the present invention. A non-limiting list of such common additives includes iron control agents (e.g. reducing agents), water-wetting surfactants, non-emulsifiers, de-emulsifiers, foaming agents, anti-sludging agents, clay and/or fines stabilizer, scale inhibitors, mutual solvents, friction reducers.

Alcohols and derivatives thereof, such as alkyne alcohols and derivatives and preferably propargyl alcohol and derivatives thereof can be used as corrosion inhibitor components. Propargyl alcohol itself is traditionally used as a corrosion inhibitor which works well at low concentrations. It is however a very toxic/flammable chemical to handle as a concentrate, so care must be taken when exposed to the concentrate. In the composition according to the present invention, it is preferred to use 2-Propyn-1-ol, complexed with methyloxirane, as this is a much safer derivative to handle. BASF-Basocorr® PP is an example of such a compound.

Metal iodides or iodates such as potassium iodide, sodium iodide, cuprous iodide and lithium iodide can potentially be used as corrosion inhibitor intensifier along with the composition according to preferred embodiments of the present invention. In fact, potassium iodide is a metal iodide traditionally used as corrosion inhibitor intensifier, however it is expensive, but works extremely well. It is non-regulated and safe to handle. The iodide or iodate is preferably present in a weight percentage ranging from 0.1 to 5 wt %, more preferably from 0.2 to 3 wt %, yet even more preferably from 0.25 to 2 wt %.

Process to Prepare a Composition According to a Preferred Embodiment of the Invention

EXAMPLE 1

Preparation of the MEA-HCl Component

Monoethanolamine (MEA) and hydrochloric acid are used as starting reagents. To obtain a 1:4.1 molar ratio of MEA to HCl, one must first mix 165 g of MEA with 835 g of water. This forms the monoethanolamine solution. Subsequently, one takes 370 ml of the previously prepared monoethanolamine solution and mixes with 350 ml of HCl aq. 36% (22 Baume). In the event that additives are used, they are added after thorough mixing of the MEA solution and HCl. For example, potassium iodide can be added at this point as well as any other component desired to optimize the performance of the composition according to the present invention. Circulation is maintained until all products have been solubilized. Additional products can now be added as required.

The resulting composition of this step is a clear (slightly yellow) liquid having shelf-life of greater than 1 year. It has a boiling point temperature of approximately 100° C. It has a specific gravity of 1.1±0.02. It is completely soluble in water and its pH is less than 1. The freezing point was determined to be less than −35° C.

The composition is biodegradable and is classified as non-corrosive to dermal tissue in a concentrate form, according to the classifications and $3^{rd}$ party testing for dermal corrosion. The composition is substantially lower fuming or vapor pressure compared to 15% HCl. Toxicity testing was calculated using surrogate information and the $LD_{50}$ was determined to be greater than −1300 mg/kg.

EXAMPLE 2

Preparation of the Lysine-HCl Component

Lysine mono-hydrochloride is used as starting reagent. To obtain a 1:2.1 molar ratio of lysine to HCl, 370 ml of a 50 wt % lysine-HCl (also referred to as L50) solution and 100 ml HCl aq. 36% (22 Baume) are combined. In the event that additives are used, they are added after thorough mixing. For example, propargyl alcohol, and potassium iodide can be added at this point. Circulation is maintained until all products have been solubilized. Additional components can now be added as required. The process to obtain other compositions according to the present invention is similar where the only difference lies in the amount of HCl added.

The resulting composition of this step is an amber colored liquid with a fermentation like odour having shelf-life of greater than 1 year. It has a freezing point temperature of approximately minus 30° C. and a boiling point temperature of approximately 100° C. It has a specific gravity of 1.15±0.02. It is completely soluble in water and its pH is less than 1.

The composition is biodegradable and is classified as non-corrosive to dermal tissue according to the classifications and $3^{rd}$ party testing for dermal corrosion. The composition is substantially low fuming/low vapor pressure compared to HCl. Toxicity testing was calculated using surrogate information and the $LD_{50}$ was determined to be greater than 2000 mg/kg.

To obtain a Lysine-HCl composition where the ratio is 1:4.5, one can use the following mixing ratio: 370 ml of the L50 solution (described above)+300 ml 22Baume HCl; which leads to the following ratio: 1 mol lysine to 4.5 mol HCl.

EXAMPLE 3

Blending the MEA-HCl Composition and Lysine-HCl Composition

After mixing the lysine-HCl (1:4.5 ratio) composition obtained in step 2 with the MEA-HCl composition obtained in step 1, the resulting blend was left to age for at least 24 hrs to get the superior corrosion rates. It was noted that a longer aging time than 24 hours didn't increase the corrosion protection any further. This is indicative of a possible reaction between the components of the modified acids.

According to a preferred embodiment of the present invention, the composition comprising an alkanolamine and a strong acid may further comprise a corrosion inhibition package itself comprising a terpene; a cinnamaldehyde or a derivative thereof; at least one amphoteric surfactant; and a solvent.

According to a preferred embodiment of the present invention, the composition comprising an alkanolamine, an amino acid and HCl can be adapted for their intended use and/or the geological formation of interest by varying the amount of alkanolamine versus the amount of amino acid. Preferably, the proportion of alkanolamine:amino acid can vary between 1%:99% by weight to 99%:1% by weight in terms of the total combined weight of alkanolamine and amino acid. More preferably, the proportion of alkanolamine:amino acid can vary between 20%:80% by weight to 80%:20% by weight in terms of the total combined weight of alkanolamine and amino acid. Even more preferably, the proportion of alkanolamine:amino acid can vary between 40%:60% by weight to 60%:40% by weight in terms of the total combined weight of alkanolamine and amino acid.

According to another preferred embodiment, the proportion of alkanolamine:amino acid can be established based on moles and can vary between 1%:99% to 99%:1% in terms of total combined moles of alkanolamine and amino acid. More preferably, the proportion of alkanolamine:amino acid can vary between 20%:80% to 80%:20% in terms of total combined moles of alkanolamine and amino acid. Even more preferably, the proportion of alkanolamine:amino acid can vary between 40%:60% to 60%:40% in terms of total combined moles of alkanolamine and amino acid.

In other preferred embodiments of the present invention, 2-Propyn-1-ol, complexed with methyloxirane can be present in a range of 0.05-5.0 wt/wt %, preferably it is present in an amount ranging from 0.1 to 3 wt %, even more preferably from 0.5 to 2.0 wt/wt % and yet even more preferably from 0.75 to 1.5 wt/wt %. As a substitute for potassium iodide one could use sodium iodide, copper iodide and lithium iodide. However, potassium iodide is the most preferred.

Corrosion Testing

Compositions according to preferred embodiments of the present invention were exposed to corrosion testing. The results of the corrosion tests and comparative corrosion testing are reported in Tables 1 through 9. The controls used were compositions of HCl. Various steel grades were studied to the listed compositions for various periods of time at varying temperatures.

TABLE 2

Corrosion testing using various compositions according to preferred embodiments of the present invention using J55 steel with an exposure time of 6 hours (steel surface area 28.922 cm2, density of 7.86 g/cc)

| Fluid | % | T | CI | Difference | Mils/yr | mm/year | lb/ft2 | Pit |
|---|---|---|---|---|---|---|---|---|
| 30% | 50 | 90 | 0.35% | 0.081 | 203.799 | 5.176 | 0.006 | 0 |
| 50% | 50 | 90 | 0.35% | 0.077 | 194.949 | 4.952 | 0.005 | 0 |
| 70% | 50 | 90 | 0.35% | 0.085 | 215.430 | 5.472 | 0.006 | 0 |
| 30% | 90 | 120 | 0.75% | 0.177 | 447.802 | 11.374 | 0.013 | 1 |
| 50% | 90 | 120 | 0.75% | 0.137 | 347.167 | 8.818 | 0.010 | 1 |
| 70% | 90 | 120 | 0.75% | 0.094 | 238.440 | 6.056 | 0.007 | 0 |

TABLE 3

Corrosion testing using various compositions according to preferred embodiments of the present invention using N80 steel with an exposure time of 6 hours at 90° C. (steel surface area 28.0774 cm2, density of 7.86 g/cc)

| Fluid | % | CI | Difference | Mils/yr | mm/year | lb/ft2 | Pit |
|---|---|---|---|---|---|---|---|
| 30% Ex. 1 | 50 | 0.35% CI-5 | 0.099 | 257.5 | 6.543 | 0.007 | 3 |
| 50% Ex. 1 | 50 | 0.35% CI-5 | 0.105 | 274.5 | 6.973 | 0.008 | 3 |
| 70% Ex. 1 | 50 | 0.35% CI-5 | 0.096 | 249.2 | 6.331 | 0.007 | 4 |

TABLE 1

Corrosion testing carried out for 4 hours at 150° C. on L80 steel coupons (28.0774 cm2 of surface area, 7.86 g/cc density)

| Fluid | Corrosion Package | Initial Wt. (g) | Final wt. (g) | Loss wt. (g) | Mils/yr | mm/year | lb/ft2 | Pit Index |
|---|---|---|---|---|---|---|---|---|
| 50% Ex. 1-50% Ex. 2 | 2.25% CI-5 2.25% CI-1A | 60.0321 | 59.8039 | 0.228 | 891.550 | 22.645 | 0.017 | Aged over night |
| 60% Ex. 1-40% Ex. 2 | 2.25% CI-5 2.25% CI-1A | 60.6072 | 60.3521 | 0.255 | 996.645 | 25.315 | 0.019 | Aged over night |
| 70% Ex. 1-30% Ex. 2 | 2.25% CI-5 2.25% CI-1A | 60.9507 | 60.6541 | 0.297 | 1158.781 | 29.433 | 0.022 | Aged over night |
| Ex. 2 | 2.25% CI-5 2.25% CI-1A | 59.3822 | 58.9717 | 0.410 | 1603.774 | 40.736 | 0.030 | |
| Ex. 1 | 2.25% CI-5 2.25% CI-1A | 60.762 | 60.4415 | 0.321 | 1252.155 | 31.805 | 0.023 | |
| 40% Ex. 1-60% Ex. 2 | 2.25% CI-5 2.25% CI-1A | 60.2844 | 59.7324 | 0.552 | 2156.598 | 54.778 | 0.040 | No aging |
| 30% Ex. 1-70% Ex. 2 | 2.25% CI-5 2.25% CI-1A | 60.2114 | 59.6191 | 0.592 | 2314.045 | 58.777 | 0.043 | No aging |
| 30% Ex. 1-70% Ex. 2 | 2.25% CI-5 2.25% CI-1A | 60.7239 | 60.4275 | 0.296 | 1157.999 | 29.413 | 0.022 | Aged over weekend |
| 50% Ex. 1-50% Ex. 2 | 2.25% CI-5 2.25% CI-1A | 60.1527 | 59.9403 | 0.212 | 829.821 | 21.077 | 0.016 | Aged over weekend |
| 70% Ex. 1-30% Ex. 2 | 2.25% CI-5 2.25% CI-1A | 60.2004 | 60.0115 | 0.189 | 738.010 | 18.745 | 0.014 | Aged over weekend |
| 20% Ex. 1-80% Ex. 2 | 2.25% CI-5 2.25% CI-1A | 59.8395 | 59.4999 | 0.340 | 1326.777 | 33.700 | 0.025 | |
| 30% Ex. 1-70% Ex. 2 | 2.25% CI-5 2.25% CI-1A | 60.5763 | 60.3084 | 0.268 | 1046.653 | 26.585 | 0.020 | |
| 50% Ex. 1-50% Ex. 2 | 2.25% CI-5 2.25% CI-1A | 60.1352 | 59.9172 | 0.218 | 851.700 | 21.633 | 0.016 | |
| 70% Ex. 1-30% Ex. 2 | 2.25% CI-5 2.25% CI-1A | 60.191 | 60.0342 | 0.157 | 612.599 | 15.560 | 0.011 | |
| 80% Ex. 1-20% Ex. 2 | 2.25% CI-5 2.25% CI-1A | 60.2361 | 60.0446 | 0.191 | 748.168 | 19.003 | 0.014 | |

CI-1A is a 10 wt % solution in water of potassium iodide and CI-5 is a proprietary corrosion inhibitor blend comprising: a terpene; a propargyl alcohol or derivative thereof; at least one amphoteric surfactant; and a solvent.

TABLE 4

Corrosion testing using various compositions according to preferred embodiments of the present invention using P110 steel with an exposure time of 6 hours (steel surface area 28.922 cm2, density of 7.86 g/cc)

| Fluid | % | T | Corrosion | Difference | Mils/yr | mm/year | lb/ft2 | Pit |
|---|---|---|---|---|---|---|---|---|
| 30% Ex. 1 | 50 | 90 | 0.35% CI-5 | 0.130 | 327.69 | 8.324 | 0.009 | 3 |
| 50% Ex. 1 | 50 | 90 | 0.35% CI-5 | 0.121 | 304.68 | 7.739 | 0.009 | 3 |
| 70% Ex. 1 | 50 | 90 | 0.35% CI-5 | 0.111 | 280.66 | 7.129 | 0.008 | 3 |
| 30% Ex. 1 | 90 | 12 | 0.75% CI-5 | 0.101 | 254.37 | 6.461 | 0.007 | 0 |
| 50% Ex. 1 | 90 | 12 | 0.75% CI-5 | 0.188 | 475.36 | 12.074 | 0.013 | 2 |
| 70% Ex. 1 | 90 | 12 | 0.75% CI-5 | 0.170 | 430.60 | 10.937 | 0.012 | 0 |

TABLE 5

Corrosion testing using a various composition according to preferred embodiments of the present invention (at 90% strength) using L80 steel with an exposure time of 6 hours at 120° C. (steel surface area 28.0774 cm2, density of 7.86 g/cc)

| Fluid | Fluid | CI | Difference | Mils/yr | mm/year | lb/ft2 | Pit |
|---|---|---|---|---|---|---|---|
| 30% | 90 | 0.75% | 0.136 | 353.963 | 8.991 | 0.010 | 1 |
| 50% | 90 | 0.75% | 0.173 | 450.073 | 11.432 | 0.013 | 3 |
| 70% | 90 | 0.75% | 0.159 | 413.869 | 10.512 | 0.012 | 4 |

TABLE 6

Comparative Corrosion testing comparison between MEA-HCl using no additive - run time of 6 hours on 1018 steel coupons at a temperature of 110° C. having a surface area of 41.4 $cm^2$ (coupon density of 7.86 g/cc)

| Fluid | Temp ° C. | Corrosion Package | Initial Wt. (g) | Final wt. (g) | Loss wt. (g) | Mils/yr | mm/year | lb/ft2 |
|---|---|---|---|---|---|---|---|---|
| 15% HCl | 110 | none | 74.143 | 48.421 | 25.722 | 45436.180 | 1154.079 | 1.273 |
| Example 1 diluted to 50% | 110 | none | 74.181 | 62.579 | 11.603 | 20495.131 | 520.576 | 0.574 |

TABLE 7

Comparative Corrosion testing on J-55 steel coupons having a density of 7.86 g/ml and a surface area of 28.922 $cm^2$ at 70° C. for a period of 6 hours

| Fluid | Additives | Initial wt (g) | Final wt (g) | Wt loss (g) | Mils/yr | mm/year | lb/ft2 |
|---|---|---|---|---|---|---|---|
| Lysine-HCl 1:4 | None | 33.2827 | 30.8391 | 2.444 | 6178.7058 | 156.939 | 0.173 |
| Lysine-HCl 1:4 + 50% Distilled water | None | 35.0081 | 34.4093 | 0.599 | 1514.0813 | 38.458 | 0.042 |
| 15% HCl | None | 36.7962 | 34.6209 | 2.175 | 5500.3023 | 139.708 | 0.154 |
| 7.5% HCl | None | 36.8248 | 35.4207 | 1.404 | 3550.3032 | 90.178 | 0.100 |

TABLE 8

Corrosion testing comparison between MEA-HCl using various additives - run time varying between 2 and 6 hours on L-80 steel coupons at various temperatures having a surface area of 28.0774 $cm^2$ (coupon density of 7.86 g/cc)

| Fluid | Fluid | Temp | Corrosion | Loss | Run | Mils/yr | mm/year | lb/ft2 |
|---|---|---|---|---|---|---|---|---|
| Example 1 | 50% | 130 | 2.0% CI-5 | 0.194 | 6 | 504.248 | 12.808 | 0.014 |
| Example 1 | 50% | 130 | 3.0% CI-5 | 0.276 | 6 | 718.345 | 18.246 | 0.020 |

TABLE 8-continued

Corrosion testing comparison between MEA-HCl using various additives - run time varying between 2 and 6 hours on L-80 steel coupons at various temperatures having a surface area of 28.0774 cm² (coupon density of 7.86 g/cc)

| Fluid | Fluid | Temp | Corrosion | Loss | Run | Mils/yr | mm/year | lb/ft2 |
|---|---|---|---|---|---|---|---|---|
| Example 1 | 50% | 150 | 2.0% CI-5 | 0.243 | 4 | 950.544 | 24.144 | 0.018 |
| Example 1 | 50% | 150 | 3.0% CI-5 | 0.231 | 4 | 903.6614 | 22.953 | 0.017 |
| Example 1 | 50% | 200 | 7.5% CI-5 | 0.355 | 2 | 2775.448 | 70.496 | 0.026 |
| Example 1 | 50% | 110 | 1.75% CI-5 | 0.077 | 6 | 200.0323 | 5.081 | 0.006 |

The dilution of the fluid is done by using the concentrate (Example 1) composition and diluting with tap water to half the original concentration.
CI-1A refers to potassium iodide; CI-5 refers to a proprietary corrosion inhibitor package comprising a terpene; a cinnamaldehyde or a derivative thereof; at least one amphoteric surfactant; and a solvent.

TABLE 9

Corrosion testing comparison between MEA-HCl and DEA-HCl using various additives - run time varying between 2 and 6 hours on various steel coupons at a temperature of 110° C. having a surface area of 28.0774 cm² (coupon density of 7.86 g/cc)

| Steel | Fluid | Corrosion Package | Initial Wt. (g) | Final wt. (g) | Loss wt. (g) | Run Time (hours) | Mils/yr | mm/year | lb/ft2 |
|---|---|---|---|---|---|---|---|---|---|
| N80 | Example 1 diluted to 50% | 1.75% CI-5 1% CI-1A | 61.2451 | 61.137 | 0.108 | 6 | 281.5558 | 7.152 | 0.008 |
| L80 | 50% DEA:HCl 1:4.1 | 1.75% CI-5 1% CI-1A | 60.5502 | 60.3834 | 0.167 | 4 | 651.6676 | 16.552 | 0.012 |
| N80 | 50% DEA:HCl 1:4.1 | 1.75% CI-5 1% CI-1A | 60.3421 | 60.236 | 0.106 | 4 | 414.52 | 10.529 | 0.008 |

TABLE 10

Corrosion test results for acid exposure of 4 hours at 150° C. of L80 steel coupons of 7.86 g/cc steel density (with a surface are of 28.0774 cm²)

| Fluid | % | Corrosion Package | Wt loss (g) | Mils/yr | Mm/year | Lb/ft2 |
|---|---|---|---|---|---|---|
| 50% Ex. 2- 50% Ex. 1 | 90 | 2.25% CI-5 2.25% CI-1A | 0.228 | 891.550062 | 22.645 | 0.017 |
| 40% Ex. 2- 60% Ex. 1 | 90 | 2.25% CI-5 2.25% CI-1A | 0.255 | 996.6451394 | 25.315 | 0.019 |
| 30% Ex. 2- 70% Ex. 1 | 90 | 2.25% CI-5 2.25% CI-1A | 0.297 | 1158.780668 | 29.433 | 0.022 |
| Ex. 2 | 90 | 2.25% CI-5 2.25% CI-1A | 0.410 | 1603.774323 | 40.736 | 0.030 |
| Ex. 1 | 90 | 2.25% CI-5 2.25% CI-1A | 0.321 | 1252.155105 | 31.805 | 0.023 |
| 60% Ex. 2- 40% Ex. 1 | 90 | 2.25% CI-5 2.25% CI-1A | 0.552 | 2156.597871 | 54.778 | 0.040 |
| 70% Ex. 2- 30% Ex. 1 | 90 | 2.25% CI-5 2.25% CI-1A | 0.592 | 2314.045143 | 58.777 | 0.043 |
| 70% Ex. 2- 30% Ex. 1 | 90 | 2.25% CI-5 2.25% CI-1A | 0.296 | 1157.999292 | 29.413 | 0.022 |
| 50% Ex. 2- 50% Ex. 1 | 90 | 2.25% CI-5 2.25% CI-1A | 0.212 | 829.8213548 | 21.077 | 0.016 |
| 30% Ex. 2- 70% Ex. 1 | 90 | 2.25% CI-5 2.25% CI-1A | 0.189 | 738.0096701 | 18.745 | 0.014 |
| 80% Ex. 2- 20% Ex. 1 | 90 | 2.25% CI-5 2.25% CI-1A | 0.340 | 1326.776516 | 33.700 | 0.025 |
| 70% Ex. 2- 30% Ex. 1 | 90 | 2.25% CI-5 2.25% CI-1A | 0.268 | 1046.653206 | 26.585 | 0.020 |
| 50% Ex. 2- 50% Ex. 1 | 90 | 2.25% CI-5 2.25% CI-1A | 0.218 | 851.6998839 | 21.633 | 0.016 |
| 30% Ex. 2- 70% Ex. 1 | 90 | 2.25% CI-5 2.25% CI-1A | 0.157 | 612.5988156 | 15.560 | 0.011 |
| 20% Ex. 2- 80% Ex. 1 | 90 | 2.25% CI-5 2.25% CI-1A | 0.191 | 748.1675586 | 19.003 | 0.014 |

TABLE #11

Corrosion test results for acid exposure of 6 hours at 90° C. of various steel coupons of 7.86 g/cc steel density

| Steel type | Fluid | Fluid (%) | Corrosion package | Wt loss (g) | Surface area (cm2) | Mils/yr | Mm/year | Lb/ft2 |
|---|---|---|---|---|---|---|---|---|
| J55 | 70% Ex. 2-30% Ex. 1 | 50 | 0.35% CI-5 0.15% CI-1A | 0.081 | 28.922 | 203.7991858 | 5.176 | 0.006 |
| N80 | 70% Ex. 2-30% Ex. 1 | 50 | 0.35% CI-5 0.15% CI-1A | 0.099 | 28.0774 | 257.5936346 | 6.543 | 0.007 |
| P110 | 70% Ex. 2-30% Ex. 1 | 50 | 0.35% CI-5 0.15% CI-1A | 0.130 | 28.922 | 327.6969538 | 8.324 | 0.009 |
| J55 | 50% Ex. 2-50% Ex. 1 | 50 | 0.35% CI-5 0.15% CI-1A | 0.077 | 28.922 | 194.9493452 | 4.952 | 0.005 |
| N80 | 50% Ex. 2-50% Ex. 1 | 50 | 0.35% CI-5 0.15% CI-1A | 0.105 | 28.0774 | 274.5234488 | 6.973 | 0.008 |
| P110 | 50% Ex. 2-50% Ex. 1 | 50 | 0.35% CI-5 0.15% CI-1A | 0.121 | 28.922 | 304.6873683 | 7.739 | 0.009 |
| J55 | 30% Ex. 2-70% Ex. 1 | 50 | 0.35% CI-5 0.15% CI-1A | 0.085 | 28.922 | 215.4304048 | 5.472 | 0.006 |
| N80 | 30% Ex. 2-70% Ex. 1 | 50 | 0.35% CI-5 0.15% CI-1A | 0.096 | 28.0774 | 249.2589569 | 6.331 | 0.007 |
| P110 | 30% Ex. 2-70% Ex. 1 | 50 | 0.35% CI-5 0.15% CI-1A | 0.111 | 28.922 | 280.6663725 | 7.129 | 0.008 |

TABLE #12

Corrosion test results for acid exposure of 6 hours at 120° C. of various steel coupons of 7.86 g/cc steel density

| Steel type | Fluid | Fluid (%) | Corrosion package | Wt loss (g) | Surface area (cm2) | Mils/yr | Mm/year | Lb/ft2 |
|---|---|---|---|---|---|---|---|---|
| J55 | 70% Ex. 2-30% Ex. 1 | 90 | 0.75% CI-5 0.5% CI-1A | 0.177 | 28.922 | 447.801933 | 11.374 | 0.013 |
| J55 | 50% Ex. 2-50% Ex. 1 | 90 | 0.75% CI-5 0.5% CI-1A | 0.137 | 28.922 | 347.1666031 | 8.818 | 0.010 |
| J55 | 30% Ex. 2-70% Ex. 1 | 90 | 0.75% CI-5 0.5% CI-1A | 0.094 | 28.922 | 238.4399903 | 6.056 | 0.007 |
| L80 | 70% Ex. 2-30% Ex. 1 | 90 | 0.75% CI-5 0.5% CI-1A | 0.136 | 28.0774 | 353.9633463 | 8.991 | 0.010 |
| L80 | 50% Ex. 2-50% Ex. 1 | 90 | 0.75% CI-5 0.5% CI-1A | 0.173 | 28.0774 | 450.0725992 | 11.432 | 0.013 |
| L80 | 30% Ex. 2-70% Ex. 1 | 90 | 0.75% CI-5 0.5% CI-1A | 0.159 | 28.0774 | 413.8688427 | 10.512 | 0.012 |
| P110 | 70% Ex. 2-30% Ex. 1 | 90 | 0.75% CI-5 0.5% CI-1A | 0.101 | 28.922 | 254.3697033 | 6.461 | 0.007 |
| P110 | 50% Ex. 2-50% Ex. 1 | 90 | 0.75% CI-5 0.5% CI-1A | 0.188 | 28.922 | 475.3628651 | 12.074 | 0.013 |
| P110 | 30% Ex. 2-70% Ex. 1 | 90 | 0.75% CI-5 0.5% CI-1A | 0.170 | 28.922 | 430.607957 | 10.937 | 0.012 |

TABLE #13

Corrosion test results for acid exposure of 6 hours at 110° C. of J55 steel coupons of 7.86 g/cc steel density (coupon surface area is 28.0774 cm$^2$)

| Fluid | Concentration | | Wt loss | Mils/yr | Mm/year | Lb/ft2 |
|---|---|---|---|---|---|---|
| 70% | 90 | No | 4.522 | 11433.23546 | 290.404 | 0.321 |
| 50% | 90 | No | 4.451 | 11253.45727 | 285.838 | 0.315 |
| 30% | 90 | No | 4.609 | 11653.72292 | 296.005 | 0.327 |
| 15% | | No | 3.815 | 9647.084783 | 245.036 | 0.270 |
| Ex. 2 | 90 | No | 4.094 | 10351.78494 | 262.935 | 0.290 |
| Ex. 1 | 90 | No | 6.524 | 16495.59712 | 418.988 | 0.462 |

TABLE 14

Corrosion test results for acid exposure of 3 hours at 190° C. of L80 steel coupons of 7.86 g/cc steel density (coupons surface area is 28.0774 cm²)

| Fluid | % Corrosion | Wt loss | Mils/yr | Mm/year | Lb/ft2 |
|---|---|---|---|---|---|
| 30% | 90 5.0% CI-5 | 2.020 | 10523.57251 | 267.299 | 0.147 |
| 50% | 90 5.0% CI-5 | 2.455 | 12789.56303 | 324.855 | 0.179 |
| 70% | 90 5.0% CI-5 | 1.992 | 10376.1529 | 263.554 | 0.145 |

With respect to the corrosion impact of the composition on typical oilfield grade steels, it was established that the compositions according to preferred embodiments of the present invention were clearly well below the acceptable corrosion limits set by industry for certain metals, such as L80 and typical coiled tubing grades of metal.

In light of the corrosion tests carried out at 90/120/150° C., one notes a positive synergistic effect in the use of the amino acid and an alkanolamine with a mineral acid. This means that the corrosion rate of the hybrid is lower than the educts, but it's also lower with a higher amino acid (in the case of the tests, lysine) content. This is special as the corrosion rates of the Lysine-HCl are higher than those of MEA-HCl on its own.

The composition according to a preferred embodiment of the present invention should show superior corrosion rates in sour conditions, as the MEA acts as a $H_2S$ scavenger in conditions up to temperature of 110° C.

The corrosion testing carried out helps to determine the positive impact of the use of such modified acid compositions according to the present invention compared to the industry standard HCl blends with full additive loadings when exposed to a variety of temperatures.

The results obtained using HCl and Lysine-HCl and MEA-HCl were used as a baseline to compare with the compositions according to preferred embodiment of the present invention. In addition, the temperatures of some of the testing was above 90° C., the temperature at which urea decomposition into ammonia and carbon dioxide begins to occur.

Additionally, compositions according to preferred embodiments of the present invention will allow the end user to utilize an alternative to conventional acids that have the many down-hole performance advantages, transportation and storage advantages as well as the health, safety and environmental advantages. Enhancement in corrosion control is an advantage of the present invention versus the use of HCl at temperatures above and below 90° C. The reduction in skin corrosiveness, the controlled spending nature or proton donation, and the higher spent pH, salinity tolerance are other advantages depending on the preferred embodiments of the compositions according to the present invention.

Dissolution Testing

In order to assess the effectiveness of the modified acid according to a preferred embodiment of the present invention, dissolution testing was carried out to study the dissolution power of various compositions upon exposure to calcium carbonate and crushed dolomite. The tests were carried out at a temperature of 23° C. and were compared to the efficacy of a solution of 15% HCl and 28% HCl. The results are reported in Table 15 and 16 below.

TABLE 15

Dissolution results for various acid compositions and total solubility of calcium carbonate

| Fluid | Initial Weight | Final Weight | Weight Loss/g | Acid Solubility % | Total Solubility - kg/m³ |
|---|---|---|---|---|---|
| HCl 15% | 20.0142 | 9.3023 | 10.7119 | 53.52 | 214 |
| HCl 15% | 25.0018 | 15.4885 | 9.5133 | 38.05 | 190 |
| HCl 28% | 20.0032 | 0.9922 | 19.011 | 95.04 | 380 |
| HCl 28% | 25.0024 | 3.84442 | 21.15798 | 84.62 | 423 |
| MEA:HCl 1:5.8 | 15.0432 | 3.5958 | 11.4474 | 76.10 | 229 |
| MEA:HCl 1:3.5 | 15.0434 | 5.9654 | 9.078 | 60.35 | 182 |
| MEA:HCl 1:3.8 | 15.0422 | 5.0306 | 10.0116 | 66.56 | 200 |
| MEA:HCl 1:4.1 | 15.0134 | 4.1962 | 10.8172 | 72.05 | 216 |
| MEA:HCl 1:4.7 | 15.0513 | 3.5523 | 11.499 | 76.40 | 230 |
| MEA:HCl 1:6.4 | 15.0328 | 1.4028 | 13.63 | 90.67 | 273 |
| MEA:HCl 1:7 | 15.00576 | 0.2064 | 14.79936 | 98.62 | 296 |
| MEA:HCl 1:9.9 | 18.5574 | 6.4458 | 18.5594 | 74.22 | 371 |
| DEA:HCl 1:3.5 | 15.0222 | 5.6072 | 9.415 | 62.67 | 188 |
| DEA:HCl 1:4 | 15.0356 | 4.0526 | 10.983 | 73.05 | 220 |
| Lysine HCl 1:2 | 15.001 | 8.851 | 6.15 | 41.00 | 123 |
| Lysine HCl 1:3 | 15.032 | 5.2723 | 9.7597 | 64.93 | 195 |
| Lysine HCl 1:4 | 15.007 | 2.1423 | 12.8647 | 85.72 | 257 |
| Lysine HCl 1:5 | 15.024 | 1.5857 | 13.4383 | 89.45 | 269 |
| Lysine HCl 1:6 | 20.014 | 4.8421 | 15.1719 | 75.81 | 303 |
| Lysine HCl 1:7 | 20.052 | 2.7721 | 17.2799 | 86.18 | 346 |
| Lysine HCl 1:9 | 20.0023 | 2.2158 | 17.7865 | 88.92 | 356 |
| Lysine HCl 1:9 | 25.0012 | 6.8558 | 18.1454 | 72.58 | 363 |
| Lysine HCl 1:12.5 | 20.0015 | 0.1516 | 19.8499 | 99.24 | 397 |
| 70% Ex. 2-30% Ex. 1* | 15.0123 | 2.827 | 12.1853 | | 244 |
| 50% Ex. 2-50% Ex. 1* | 15.0064 | 3.0999 | 11.9065 | | 238 |
| 30% Ex. 2-70% Ex. 1* | 15.0071 | 3.5441 | 11.463 | | 229 |

*indicates that the dissolution was performed at 20° C.

TABLE 16

Acid Solubility Test with Crushed Dolomite (at 23° C.) using a volume of 50 ml of composition

| Fluid | Initial Weight | Final Weight | Weight Loss/g | Acid Solubility % | Total Solubility - kg/m³ |
|---|---|---|---|---|---|
| Example 1 | 15.032 | 5.5323 | 9.4997 | 63.20 | 190 |
| Example 1 diluted at 50% | 10.0318 | 5.198 | 4.8338 | 48.18 | 97 |
| 30% Ex. 2-70% Ex. 1* | 14.9963 | 9.4408 | 5.5555 | | 111.11 |
| 50% Ex. 2-50% Ex. 1* | 14.9925 | 9.247 | 5.7455 | | 114.91 |
| 30% Ex. 2-70% Ex. 1* | 15.0071 | 9.0923 | 5.9148 | | 118.30 |

*indicates that the dissolution was performed at 20° C.

The above dissolution test confirms that the compositions according to a preferred embodiment of the present invention provide comparable dissolution performance in comparison to a mineral acid of similar concentration and modified acids as well.

As well, wormholing/acid flux efficiency testing has shown a far superior property of the composition comprising a 50% content of MEA-HCl and 50% content of Lysine-HCl over 15% or 28% HCl at various injection rates Spend/Reaction Rate (Hydrogen Proton Donation)

Tests were conducted to assess the reactivity of the compositions according to preferred embodiment of the present invention.

Determination of Reaction Rate of Modified Acid at 60° C.

A predetermined amount of modified acid was heated to 60° C. in a water bath. The solution was then placed on a balance and a pre-weighed calcium carbonate sample was submerged in the heated solution. The weight was recorded at every 1 minute interval for 30 minutes. From the recorded weight, the weight loss percentage was calculated and plotted as a function of time.

Based on the data obtained, the two varying concentrations (50% and 90%) of the same composition according to a preferred embodiment of the present invention had their spend rates plotted for five ratios of Lysine-HCl:MEA-HCl (80:20, 70:30, 50:50, 30:70 and 20:80). The graphical representation of the testing is illustrated in FIGS. 1 to 5.

Although this invention exhibits a more methodical reaction rate when compared to 15% HCl, it is more reactive than most typical modified, complexed or synthetic acids at concentrations from 33% to 90%, coming very close to the reaction rate of a 15% HCl at even a 33% dilution. Having a safer modified acid system that reacts substantially faster than other safer modified acid systems is advantageous in a spearhead application where the purpose of the acid is to clean up residual cement from perforations and assist in reducing the breakdown or reduce pressure during the early stages of a stimulation treatment (frac or matrix water-based). It is advantageous to have an acid system that can be stored on location as a concentrate (providing a high level of safety even in concentrate form) that can then be deployed and diluted or blended to the desired concentration on the fly with fresh or produced (high salinity) water. When difficult areas of the well treatment are encountered (high breakdown pressures nearing the maximum allowable pressure of the treating equipment) the concentration can be increased, thereby reducing the time it takes to achieve the desired injection rate of the following fluid system.

Wormholing Testing

Numerous studies of the wormholing process in carbonate acidizing have shown that the dissolution pattern created by the flowing acid can be characterized as one of three types (1) compact dissolution, in which most of the acid is spent near the rock face; (2) wormholing, in which the dissolution advances more rapidly at the tips of a small number of highly conductive micro-channels, i.e. wormholes, than at the surrounding walls; and (3) uniform dissolution.

The dissolution pattern that is created depends on the interstitial velocity, which is defined as the acid velocity flowing through the porous medium. Interstitial velocity is related to the injection rate (interstitial velocity=injection rate/(area of low porosity). Compact dissolution patterns are created at relatively low injection rates, wormhole patterns are created at intermediate rates and uniform dissolution patterns at high rates.

This interstitial velocity at the wormhole tip controls the wormhole propagation. The optimal acid injection rate is then calculated based on a semi-empirical flow correlation. At optimal injection rate, for a given volume, acid penetrates the furthest into the formation, resulting in the most efficient outcome of the acid stimulation. Wormhole structures change from large-diameter at low interstitial velocity to thin wormholes at optimal velocity conditions, to more branched patterns at high interstitial velocity.

This series of experimental testing study examined a comparative composition having a lysine:HCl molar ratio of 1:4.5 (see example 2). This composition is designed as a low-hazard/low-corrosion aqueous synthetic acid enhanced through the addition of proprietary oilfield chemistry to replace standard HCl blends, especially for high to ultra-high temperature and/or safety critical applications (i.e. offshore applications). This was compared to a composition comprising 90% (by volume) of lysine:HCl molar ratio of 1:4.5 and 50% of MEA-HCl in a molar ratio of 1:4.1 (example 3).

Figure 6:
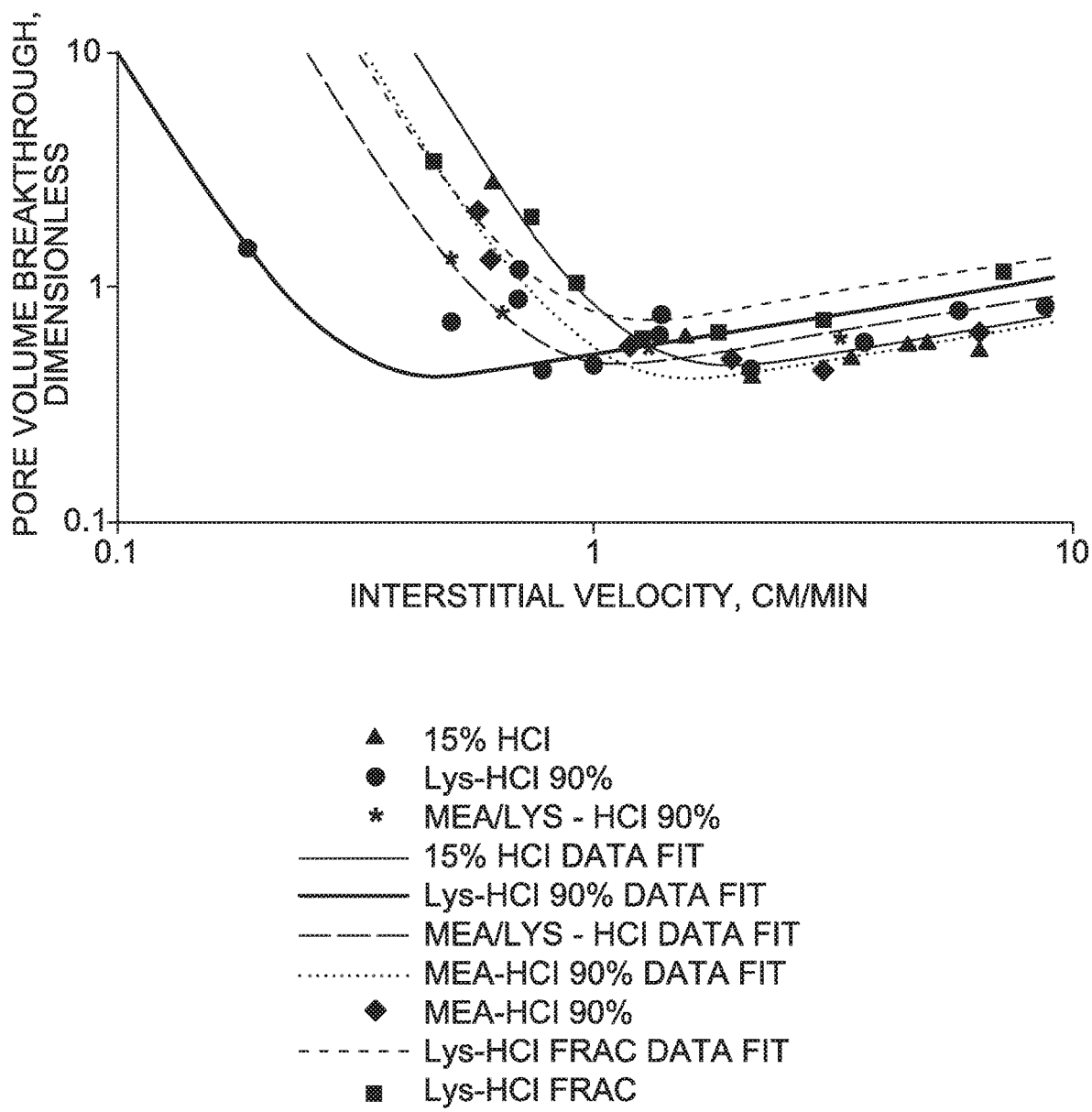
FIG. 6 is a graphical representation of the wormholing efficiency of a composition according to a preferred embodiment of the present invention compared to a HCl composition, a MEA-HCl composition and two different lysine-HCl compositions.

The acid system according to the present invention was compared to 15% HCl under the exact same testing conditions. The wormhole efficiency curve (pore volume to breakthrough vs interstitial velocity) was determined for both acid systems for comparison. One of the observations which stems from FIG. 6 is that the MEA-lysine:HCl composition (in a 50-50 mixture by volume) has similar optimal pore volume of breakthrough at a 40% lower of optimal interstitial velocity compared with HCl. This allows one to perform matrix acidizing with a composition according to the present invention rather than have recourse to a fracking operation and associated equipment when using HCl. Of course, the ratio of MEA and Lysine may be adjusted to suit various conditions determined by the geological formations in order to consistently provide optimal velocities.

Test Parameters

Two series of matrix acidizing experiments were conducted in order to evaluate the performance of above mentioned composition according to the present invention (composition of example 3 at a 90% concentration) vs lysine:HCl in a 1:4.5 molar ratio (at a 90% concentration)) and vs 15% HCl (see FIG. 6).

Figure 7:
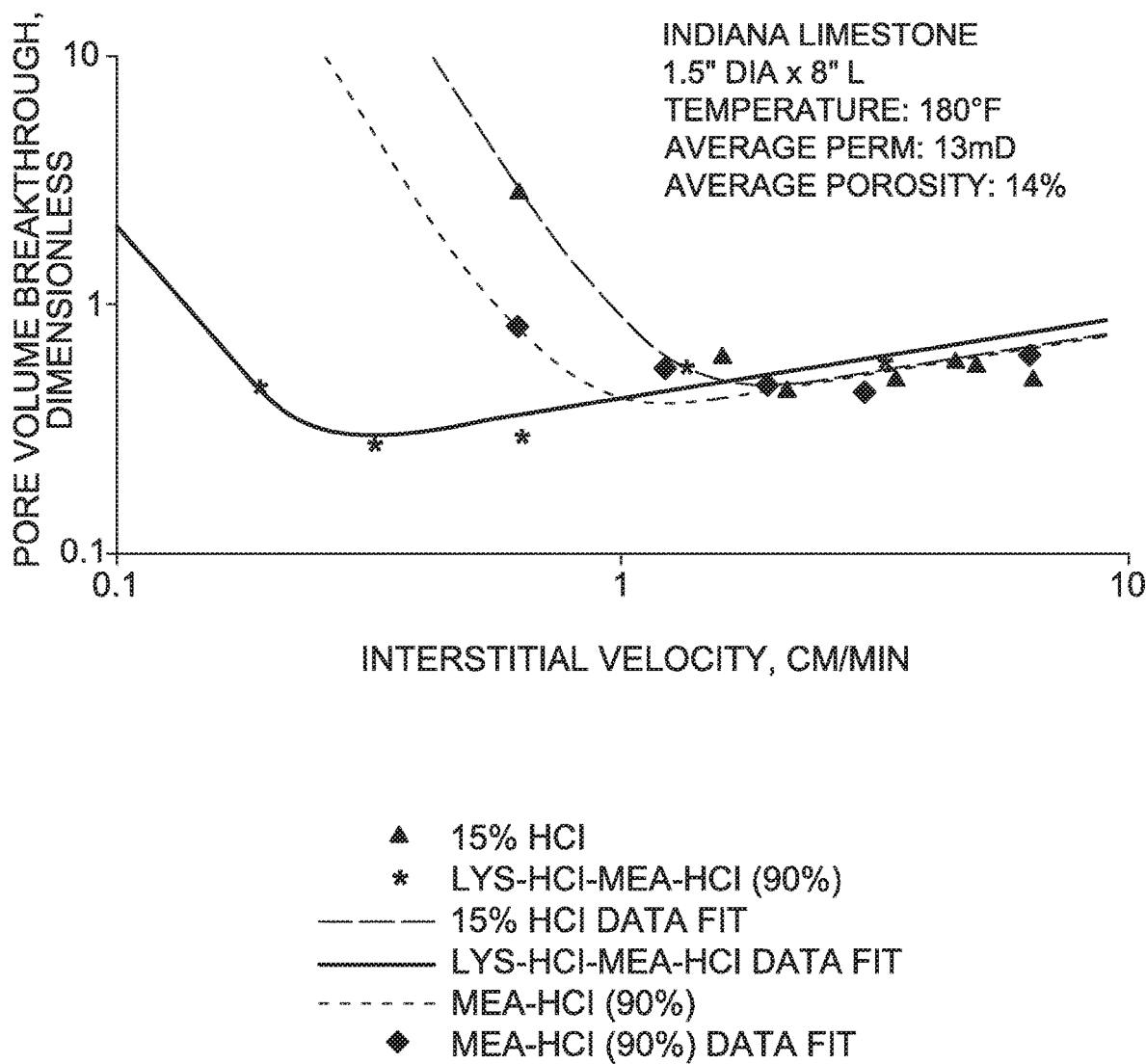
FIG. 7 is a graphical representation of the wormholing efficiency of a composition according to a preferred embodiment of the present invention compared to a HCl composition and a MEA-HCl composition.

Another series of matrix acidizing experiments of the composition according to the present invention (composition of example 3 at 90% concentration) vs MEA-HCl in a 1:4.1 molar ratio (at a 90% concentration) and vs 15% HCl (see FIG. 7).

Each one of the compositions used in the experiments comprised 0.3 vol % common commercial corrosion inhibitor, and the other set of experiments utilized a 15% solution of HCl with 0.3 vol % of a corrosion inhibitor. The experiments were conducted utilizing Indiana limestone cores.

All cores were 1.5-inch in diameter and 8-inch in length. The average porosity of the core samples was 14% and the average permeability was 13 mD. The back pressure used in these experiments was 2000 psi. The testing temperature was 180° F. (82° C.). The limestone cores were selected as they help in simulating the geology encountered most commonly in oilfields in North America.

Test Procedure

The matrix acidizing apparatus consists of a pumping system, an accumulation system, a core containment cell, a pressure maintaining system, a heating system and a data acquisition system. A Teledyne Isco® syringe pump was used to inject water and acid at constant rates. A back-pressure regulator was used to maintain the desired minimum system pressure at 2000 psi.

Confining pressure was set to 400-500 psi higher than the injection pressure to avoid fluid leaking. Two heating tapes were used to heat the core holder and the injection fluid for the high-temperature tests. During the experiment, the system was first pressurized by injecting water, once the flow reached a steady state; permeability was calculated from the measured pressure differential across the core containment cell. The system was then heated to the experiment temperature. When the full system; fluid, core containment cell and core reached the target temperature, water injection was ceased and acid injection commenced.

Injection was ceased when wormholes breach the core and acid injection time was recorded for the breakthrough pore volume calculation. For each experimental condition, 4-6 individual tests were performed with the same temperature and pressure parameters. The only condition that changed was the injection rate. The rate varied in a range until the optimal condition was identified. The Buijse and Glasbergen (2005) model was utilized to generate the wormhole efficiency relationship by fitting the experimental data obtained.

Core Properties

The cores utilized for testing were 1.5 inches in diameter and 8 inches long. Indiana limestone samples were obtained from one sample of outcrop to ensure linear properties.

Experimental Results

The experimental results for HCl are listed in Table 12 below. The experimental results for the composition of Example 3 are listed in Table 13 and the experimental result for Example 2 are listed in Table 14.

TABLE 12

Wormholing Experiment #1 - Experimental Results for HCl

| Core# | Acid injection rate (ml/min) | Interstitial Velocity (cm/min) | Pore Volume to Breakthrough |
|---|---|---|---|
| IC2 | 10 | 6.39 | 0.52 |
| IC1 | 8 | 4.53 | 0.60 |
| IC3 | 7 | 4.97 | 0.60 |
| IC5 | 5 | 3.47 | 0.51 |
| IC6 | 3 | 2.10 | 0.47 |
| IC16 | 2 | 1.56 | 0.64 |
| IC18 | 0.8 | 0.62 | 2.93 |

TABLE 13

Experimental Results for the Lysine-HCl - MEA-HCl composition (Example 3)

| Core# | Acid injection rate (ml/min) | Interstitial Velocity (cm/min) | Pore Volume to Breakthrough |
|---|---|---|---|
| IC101 | 2 | 1.3 | 0.58 |
| IC102 | 5 | 3.27 | 0.61 |
| IC201 | 1 | 0.64 | 0.78 |
| IC202 | 0.8 | 0.5 | 1.34 |

TABLE 14

Experimental Results for the MEA-HCl composition of Example 1

| Core# | Acid injection rate (ml/min) | Interstitial Velocity (cm/min) | Pore Volume to Breakthrough |
|---|---|---|---|
| IC111 | 10 | 6.37 | 0.63 |
| IC108 | 5 | 3.01 | 0.46 |
| IC112 | 3 | 1.92 | 0.49 |
| IC109 | 2 | 1.2 | 0.57 |
| LDA16 | 1 | 0.57 | 2.11 |

The optimal condition for two sets of experiments with Buijse and Glasbergen equation are listed in Table 15. The CT scans for both acid systems under the same conditions of 3 ml/min and a (2.1 cm/min) interstitial velocity were done. The CT scans reveal that the wormholing followed conventional pattern. The wormholes are more branched at low interstitial velocity and are more uniform and straight at high interstitial velocity. Thus, low interstitial velocity is more desirable as it provides a more spread wormholing pattern and, in practice, will unlock more hydrocarbon from hydrocarbon-bearing formations.

The optimal condition for the experiments are listed in Table 15.

TABLE 15

Optimal Condition Obtained from Experimental Results
Optimal Condition

|  | HCl | MEA-HCl | Lys-HCl - MEA-HCl |
|---|---|---|---|
| PVbt-opt | 0.46 | 0.41 | 0.47 |
| Vi-opt | 1.97 | 1.62 | 1.17 |
| PVbt-opt difference |  | 11% | 2% |
| Vi-opt difference |  | 18% | 40% |

Preliminary observations of wormhole efficiency tests: the optimal interstitial velocity for the composition of Example 1 is lower by 18% compared to HCl providing a potential advantage over conventional HCl acid systems, the composition of Example 3 was lower by 40% compared to the same HCl content. The objective is to obtain fast wormhole propagation (high stimulation efficiency) without being limited by injection rate in the field and the Example 3 composition exhibits this effect; and the optimal pore volume to breakthrough for the Example 3 composition is similar to the one from the 15% HCl composition. With retarding or corrosion prevention features, other acid systems usually have increased pore volume to breakthrough because of reduced reaction rates.

Dermal Testing

Each one of the two components (Lysine-HCl and MEA-HCl) has been extensively studied for dermal irritation. The results consistently show that they have advantageous properties to minimize skin irritation compared to the mineral acid counterpart (i.e. HCl alone). The combination of the two components (in a 50:50 proportion by volume) according to a preferred embodiment of the present invention (Example 3) was tested on human skin.

A few drops of the composition of Example 3 were placed on the back of the hand of an individual, visual assessment was done by looking at the skin with the drops at time intervals of 15, 30, 45 and 60 minutes. Visual analysis of the skin during and after the dermal test showed no redness at any time during the testing and at the end of the testing (time=60 minutes).

Uses of Compositions According to Preferred Embodiments of the Present Invention While the compositions according to preferred embodiment of the present invention can be used at full strength (undiluted) for a wide range of application, the uses (or applications) of the compositions according to the present invention upon dilution thereof ranging from approximately 1 to 90% dilution, include, but are not limited to: injection/disposal well treatments; matrix acid squeezes or stimulations, scale treatment soaks or bullheads; acid fracturing, acid washes; fracturing spearheads (breakdowns); pipeline scale treatments, cement breakdowns or perforation cleaning for abandonment or remedial purposes; pH control; and de-scaling applications, high temperature (up to 190° C.) cyclical steam scale treatments and steam assisted gravity drainage (SAGD) scale treatments (up to 190° C.). The various potential applications are summarized in Table 16. As would be understood by the person skilled in the art, the methods of use generally comprise the following steps: providing a composition according to a preferred embodiment of the present invention; exposing a surface (such as a metal surface) to the aqueous modified acid composition; allowing the aqueous modified acid composition a sufficient period of time to act upon said surface; and optionally, removing the acid composition when the exposure time has been determined to be sufficient for the operation to be complete or sufficiently complete. Another method of use comprises: injecting the aqueous modified acid composition into a well and allowing sufficient time for the aqueous modified acid composition to perform its desired function, subsequently removing the acid composition from the well to stop the acid exposure. Yet another method of use comprises: exposing the aqueous modified acid composition to a body of fluid (typically water) requiring a decrease in the pH and allowing sufficient exposure time for the aqueous modified acid composition to lower the pH to the desired level.

TABLE 16

Applications for which compositions according to the present invention can be used as well as proposed dilution ranges

| Application | Suggested Dilution | Benefits |
|---|---|---|
| Injection/Disposal Wells | 10-75% | Compatible with mutual solvents and solvent blends, very cost effective. |
| Squeezes & Soaks Bullhead Annular | 33%-75% | Ease of storage & handling, cost effective compared to conventional acid stimulations. Ability to leave pump equipment in wellbore. |
| Acid Fracs/matrix treatments. Produciton well and pipeline scale treatments | 50%-90% | Decreased shipping and storage compared to conventional acid, no blend separation issues, comprehensive spend rate encourages deeper formation penetration. |
| Frac Spearheads (Break-downs) | 33%-90% | Able to adjust concentrations on the fly. Decreased shipping and storage on location. |
| Cement Break-downs | 20-90% | Higher concentrations recommended due to lower temperatures, and reduced solubility of aged cement. |
| pH Control | 0.1%-10.0% | Used in a variety of applications to adjust pH level of water based systems. |
| Liner De-Scaling, Heavy Oil | 1%-75% | Continuous injection/de-scaling of slotted liners, typically at very high temperatures. |

The main advantages of the use of the modified acid composition included: the reduction of the total loads of acid, and the required number of tanks by delivering concentrated product to location and diluting with fluids available on location or close to location (with fresh or low to high salinity production water). Other advantages of the composition according to the present invention include: operational miscibility efficiencies which can lead to the elimination of having to periodically circulate tanks of HCl acid due to chemical separation of the corrosion and surfactant and other components; reduced corrosion to downhole tubulars and surface equipment; temperature corrosion protection up to 190° C., less facility disruptions due to iron precipitation, high thermal stability of a modified acid, and reduced hazardous HCl acid exposure to personnel and environment by having a low hazard, low fuming acid (lower vapour pressure) on location.

A modified acid composition according to a preferred embodiment of the present invention, can be used to treat scale formation in SAGD or CSS (cyclical stream) operations at high temperatures (up to 190° C.) while achieving acceptable corrosion limits set by industry. This also eliminates the need for the SAGD operation to be halted for a "cool down prior to a scale treatment" and said modified acid is injected into said well to treat scale formation inside said well at high temperatures greatly reducing down-time and lost revenue for the operator.

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

What is claimed is:

1. An aqueous modified acid composition comprising:
   a mineral acid;
   an amino acid; and
   an alkanolamine;
   wherein the mineral acid:alkanolamine/amino acid are present in a molar ratio ranging from 3:1 to 12:1.

2. An aqueous modified acid composition according to claim 1, wherein the amino acid:alkanolamine proportion ranges from 1%: 99% to 99%: 1%.

3. An aqueous modified acid composition according to claim 1, wherein the amino acid:alkanolamine proportion ranges from 20%: 80% to 80%: 20%.

4. An aqueous modified acid composition according to claim 1, wherein the amino acid:alkanolamine proportion ranges from 30%: 70% to 70%: 30%.

5. An aqueous modified acid composition according to claim 1, wherein the amino acid:alkanolamine proportion is 50%: 50%.

6. The aqueous modified acid composition according to claim 1, wherein the mineral acid:alkanolamine/amino acid are present in a molar ratio of not more than 10:1.

7. The aqueous modified acid composition according to claim 1, wherein the mineral acid:alkanolamine/amino acid are present in a molar ratio of not more than 7.0:1.

8. The aqueous modified acid composition according to claim 1, wherein the mineral acid:alkanolamine/amino acid are present in a molar ratio of not more than 4:1.

9. The aqueous modified acid composition according to claim 1, wherein the mineral acid:alkanolamine/amino acid are present in a molar ratio of not more than 3:1.

10. The aqueous modified acid composition according to claim 1, wherein the mineral acid:alkanolamine/amino acid are present in a molar ratio ranging from 5:1 to 10:1.

11. The aqueous modified acid composition according to claim 1, wherein the alkanolamine is selected from the group consisting of: monoethanolamine; diethanolamine; triethanolamine and combinations thereof.

12. The aqueous modified acid composition according to claim 1, wherein the amino acid is selected from the group consisting of: lysine, glycine, valine, arginine, histidine, threonine, methionine and combinations thereof.

13. The aqueous modified acid composition according to claim 1, wherein the alkanolamine is monoethanolamine.

14. The aqueous modified acid composition according to claim 1, wherein the alkanolamine is diethanolamine.

15. The aqueous modified acid composition according to claim 1, wherein the mineral acid is selected from the group consisting of: HCl, nitric acid, sulfuric acid, sulfonic acid, phosphoric acid, and combinations thereof.

16. The aqueous modified acid composition according to claim 1, further comprising a metal iodide or iodate selected from the group consisting of: cuprous iodide; potassium iodide; sodium iodide; lithium iodide and combinations thereof.

17. The aqueous modified acid composition according to claim 1, further comprising an alkynyl alcohol or derivative thereof present in a concentration ranging from 0.01 to 5% w/w.

18. The aqueous modified acid composition according to claim 17, wherein the alkynyl alcohol or derivative thereof is propargyl alcohol or a derivative thereof.

19. The aqueous modified acid composition according to claim 16, wherein the metal iodide is present in a concentration ranging from 0.1 to 2% by weight of the total weight of the composition.

20. The use of an aqueous modified acid composition in an oil industry activity, said composition comprising:
  a mineral acid;
  an amino acid; and
  an alkanolamine;
  wherein the mineral acid:alkanolamine/amino acid are present in a molar ratio ranging from 3:1 to 12:1, and wherein the use comprises an activity selected from the group consisting of: stimulate formations; assist in reducing breakdown pressures during downhole pumping operations; treat wellbore filter cake post drilling operations; assist in freeing stuck pipe; descale pipelines and/or production wells; increase injectivity of injection wells; lower the pH of a fluid; remove undesirable scale on a surface selected from the group consisting of: equipment, wells and related equipment and facilities; fracture wells; complete matrix stimulations; conduct annular and bullhead squeezes & soaks; pickle tubing, pipe and/or coiled tubing; increase effective permeability of formations; reduce or remove wellbore damage; clean perforations; and solubilize limestone, dolomite, calcite and combinations thereof.

21. Method of treating a metal surface with a composition comprising:
  a mineral acid;
  an amino acid; and
  an alkanolamine;
  wherein the mineral acid:alkanolamine/amino acid are present in a molar ratio ranging from 3:1 to 12:1: said method comprising the steps of:
    providing said composition;
    exposing said metal surface to said composition;
    allowing said composition a sufficient period of time to act upon said surface; and
    optionally, removing the acid composition when the exposure time has been determined to be sufficient for the operation to be complete or sufficiently complete.

* * * * *